United States Patent
Fanghella et al.

(10) Patent No.: US 12,190,574 B2
(45) Date of Patent: Jan. 7, 2025

(54) OBJECT LOCATION DETERMINATION

(71) Applicant: Telefonaktiebolaget LM Ericsson (publ), Stockholm (SE)

(72) Inventors: Alfredo Fanghella, Stockholm (SE); Manish Sonal, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 551 days.

(21) Appl. No.: 17/428,863

(22) PCT Filed: Feb. 21, 2019

(86) PCT No.: PCT/EP2019/054349
§ 371 (c)(1),
(2) Date: Aug. 5, 2021

(87) PCT Pub. No.: WO2020/169199
PCT Pub. Date: Aug. 27, 2020

(65) Prior Publication Data
US 2022/0157039 A1 May 19, 2022

(51) Int. Cl.
*G06T 7/11* (2017.01)
*G06T 7/70* (2017.01)
(Continued)

(52) U.S. Cl.
CPC ............ *G06V 10/98* (2022.01); *G06T 7/11* (2017.01); *G06T 7/70* (2017.01); *G06V 10/17* (2022.01);
(Continued)

(58) Field of Classification Search
CPC .... G06V 20/20; G06V 10/17; G06V 10/7715; G06V 10/44; G06V 10/52; G06V 10/98; G06T 7/11; G06T 7/70; G06F 18/213
See application file for complete search history.

(56) References Cited

U.S. PATENT DOCUMENTS

| | | | |
|---|---|---|---|
| 9,275,302 B1* | 3/2016 | Yan | G06T 7/73 |
| 2016/0104290 A1* | 4/2016 | Patnaik | G06F 18/24 |
| | | | 382/173 |
| 2017/0330059 A1* | 11/2017 | Novotny | G06V 10/7515 |
| 2017/0344850 A1* | 11/2017 | Kobori | G06T 7/248 |

(Continued)

FOREIGN PATENT DOCUMENTS

FR 3055446 A1 3/2018

OTHER PUBLICATIONS

Azizpour, H., et al., "Object Detection Using Strongly-Supervised Deformable Part Models", Proceedings of the 12th European Conference on Computer Vision—vol. Part 1, Oct. 1, 2012, pp. 1-14.

(Continued)

*Primary Examiner* — Syed Haider
(74) *Attorney, Agent, or Firm* — COATS & BENNETT, PLLC

(57) ABSTRACT

Object parts (20, 21, 22, 23, 24) are detected in a picture using object detector(s) (3) and part location representations (40, 42, 43, 44) are generated for the detected object parts (20, 22, 23, 24). The size of an object (10) comprising object parts (20, 21, 22, 23, 24) is estimated based on a geometric model and the part location representations (40, 42, 43, 44). Search locations (51) in the picture for a search window (52) having a size based on the estimated size are determined based on the part location representations (40, 42, 43, 44). The search locations (51) are then processed by identifying any detected object part (20, 22, 23) that is within the search window (52) positioned at the search location (51). A homography is estimated by minimizing an error between mapped object part(s) from the geometric model and the identified detected object part(s) (20, 22, 23). If the error is smaller than a threshold value, an object location representation is determined for the object (10).

20 Claims, 15 Drawing Sheets

(51) Int. Cl.
*G06V 10/10* (2022.01)
*G06V 10/44* (2022.01)
*G06V 10/52* (2022.01)
*G06V 10/77* (2022.01)
*G06V 10/98* (2022.01)
*G06V 20/20* (2022.01)

(52) U.S. Cl.
CPC .............. *G06V 10/44* (2022.01); *G06V 10/52* (2022.01); *G06V 10/7715* (2022.01); *G06V 20/20* (2022.01)

(56) References Cited

U.S. PATENT DOCUMENTS

2018/0350085 A1 12/2018 Lu et al.
2019/0205642 A1 7/2019 Cugnet et al.

OTHER PUBLICATIONS

Felzenszwalb, P., et al., "Pictorial Structures for Object Recognition", International Journal of Computer Vision 61, Jan. 1, 2005, pp. 1-41.

Dornaika, F., et al., "Real-time Object Detection and Tracking in Video Sequences", Intelligent Robots and Computer Vision XXVII: Algorithms and Techniques, Jan. 18, 2010, pp. 1-11, Bellingham, WA, XP040547564.

Felzenszwalb, P., et al., "Object Detection with Discriminatively Trained Part-Baesd Models", IEEE Transactions on Pattern Analysis and Machine Intelligence, Sep. 1, 2010, pp. 1627-1645, vol. 32, No. 9.

\* cited by examiner

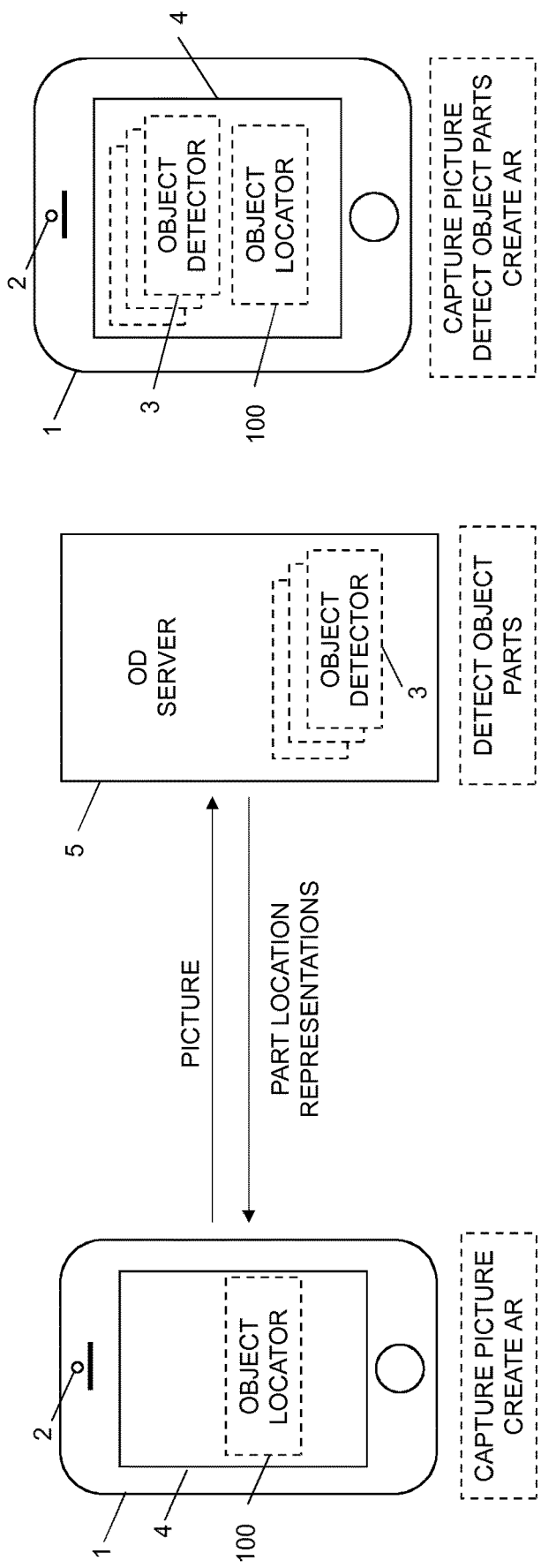

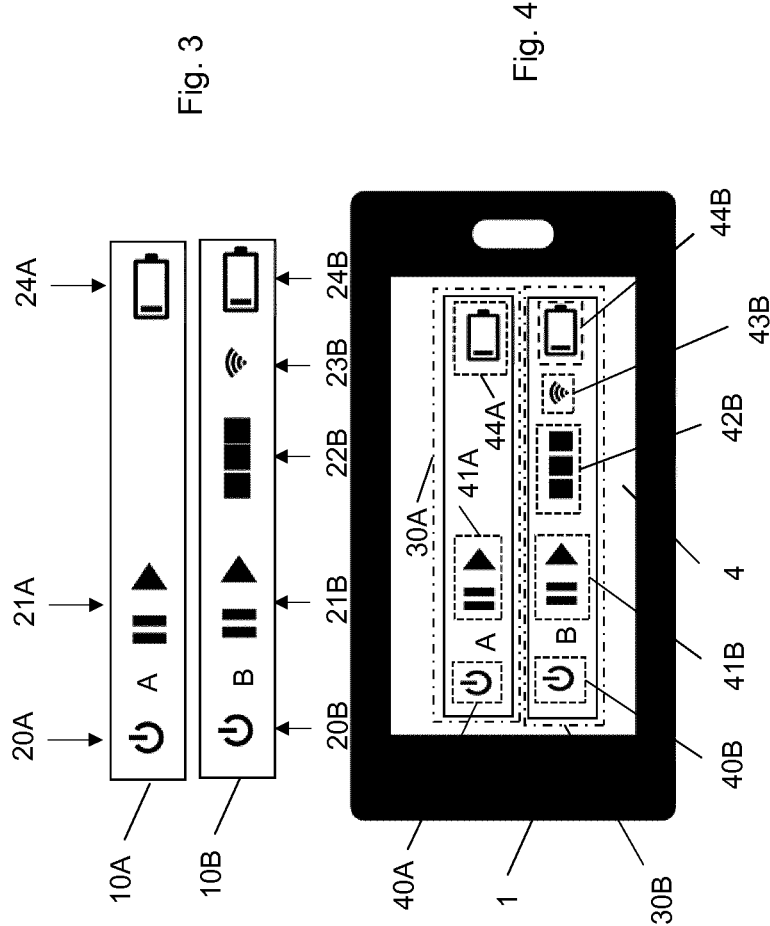

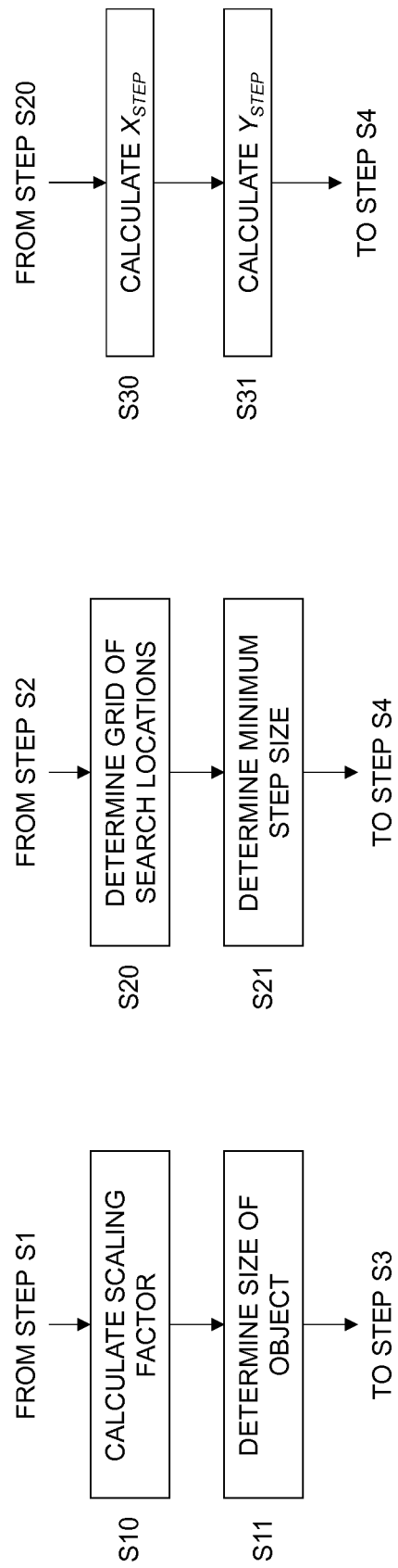

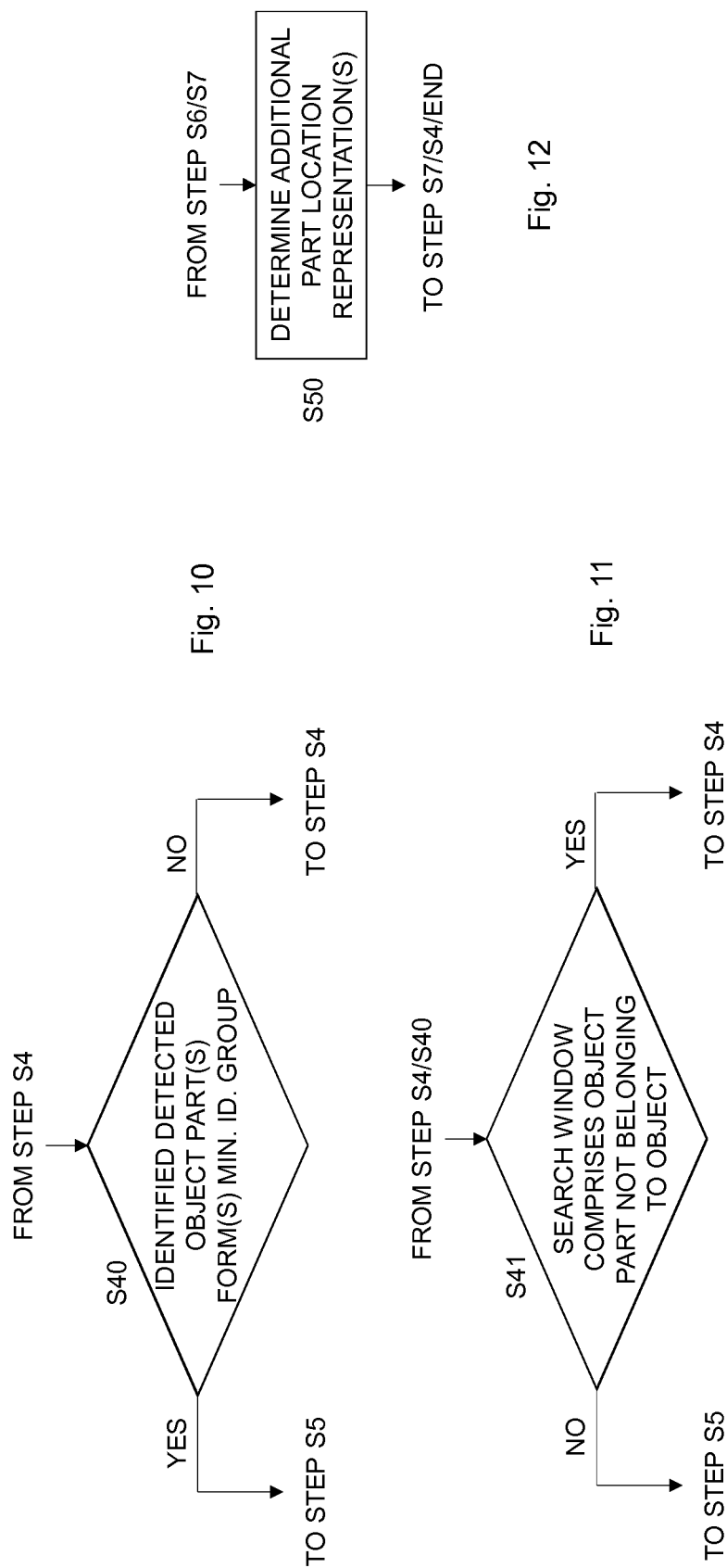

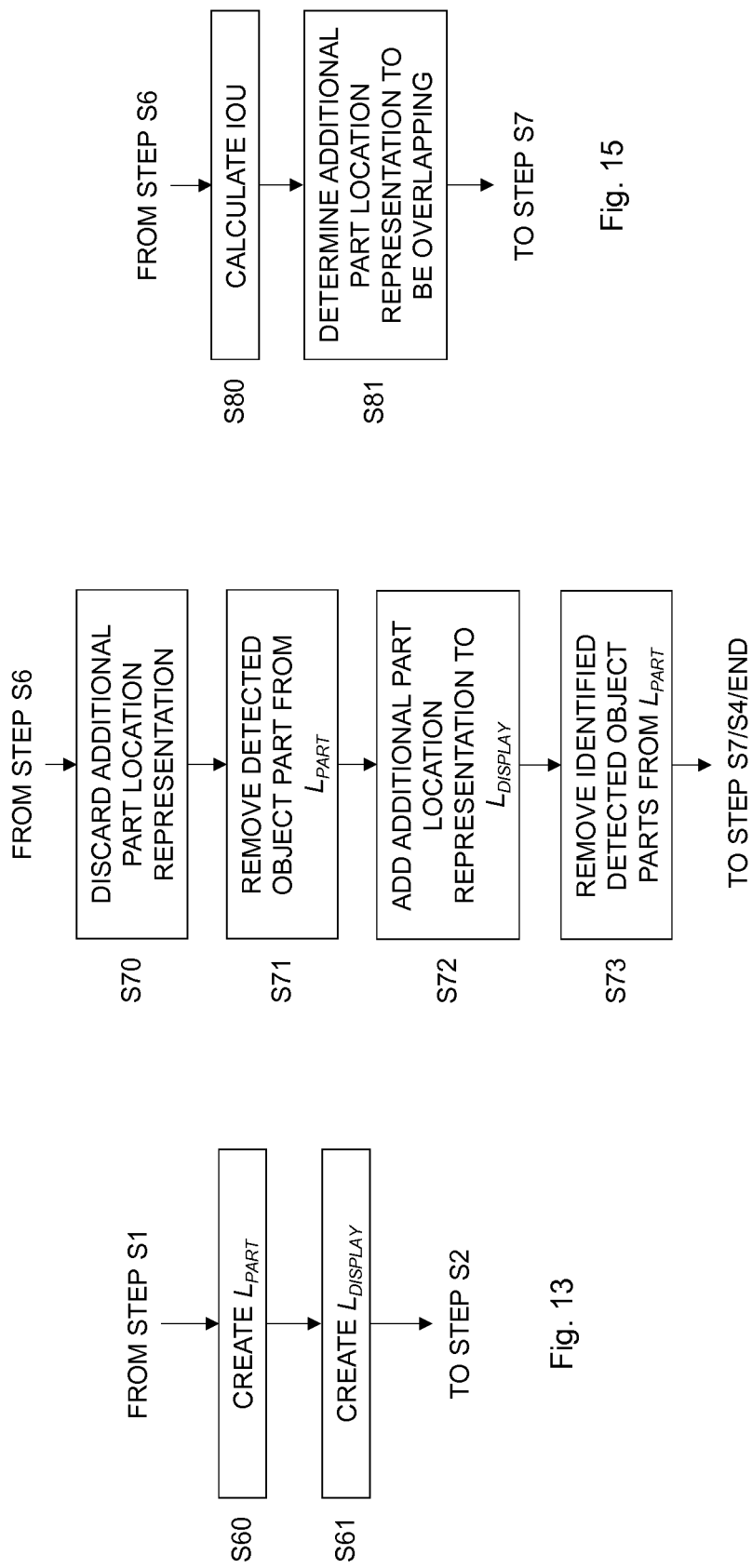

OBJECT LOCATION DETERMINATION

TECHNICAL FIELD

The invention generally relates to a method, an object locator, a computer program, a computer program product and a user device for object location determination in pictures.

BACKGROUND

Augmented reality (AR) is a direct or indirect live view of a physical, real-world environment whose objects are augmented, i.e., perceptually enriched, by computer-generated perceptual information. The overlaid perceptual information can be constructive, i.e., additive to the natural environment, or destructive, i.e., masking of the natural environment.

An increasing number of AR applications for user devices, such as smart phones and tablets, have been developed to overlay virtual objects on the real-world view. The core technological challenges in such applications are:
1) identifying real-world objects and their positions on the screen, typically denoted object detection (OD) or object recognition in the art;
2) tracking objects of interest, typically denoted object tracking (OT) in the art; and
3) augmenting the scene with artificial objects, labels, or other types of perceptual information.

Part-based models, also referred to as pictorial structures, are a family of techniques used in object detectors to locate objects using a two-stage process. In the first stage, object detectors are used to detect different object parts that constitute the object. The second stage comprises searching for sets of object parts that form a single object by evaluating the relative locations of the detected object parts. Such part-based models have recently fallen out of favor with the introduction of more accurate OD solutions based on Convolutional Neural Network (CNN) technology. These CNN-based solutions detect objects in a given picture, but require significant processing power to operate in real-time. Therefore, CNNs typically run on servers equipped with modern Graphics Processing Units (GPUs) with large amount of memory.

In some AR applications, the object detection needs to run in real-time on a portable user device. A typical example is industrial AR applications, which, for instance, can be support tools for a technician fixing complex hardware systems. The portable user device, such as in the form of a hand-held device or a head-mounted device, then comprises a camera used to capture a picture that is input to the objection detection. The prior art object detection solutions, including both CNN-based and part-based solutions, are most often too complex to be run on portable user devices with limited processing capabilities and power supply. Hence, there is a need for a more efficient objection location determination that is suitable for implementation in portable user devices.

SUMMARY

It is a general objective to provide an object location determination that is suitable for implementation in portable user devices.

This and other objectives are met by aspects of the invention as well as embodiments as disclosed herein.

An aspect of the invention relates to an object locating method. The method comprises applying at least one object detector to a picture to detect object parts in the picture and generate, for each detected object part, a part location representation defining a region of the picture. The method also comprises estimating a size of an object comprising object parts in the picture based on a geometric model of the object and of the object parts and based on the part location representations. The method further comprises determining, based on the part location representations, search locations in the picture for a search window having a size that is based on the estimated size of the object. The method comprises, for at least a portion of the determined search locations, identifying any detected object part within the search window positioned at the determined search location. The method also comprises estimating a homography mapping object part(s) in the geometric model to the identified detected object part(s) by minimizing an error between the mapped object part(s) and the identified detected object part(s). The method further comprises determining, if the error is smaller than a threshold value and for the object, an object location representation defining a region of the picture based on the homography and the geometric model.

Another aspect of the invention relates to an object locator comprising a processing circuitry and a memory comprising instructions executable by the processing circuitry. The processing circuitry is operative to apply at least one object detector to a picture to detect object parts in the picture and generate, for each detected object part, a part location representation defining a region of the picture. The processing circuitry is also operative to estimate a size of an object comprising object parts in the picture based on a geometric model of the object and of the object parts and based on the part location representations. The processing circuitry is further operative to determine, based on the part location representations, search locations in the picture for a search window having a size that is based on the estimated size of the object. The processing circuitry is operative to identify, for at least a portion of the determined search locations, any detected object part within the search window positioned at the determined search location. The processing circuitry is also operative to estimate, for at least a portion of the determined search location, a homography mapping object part(s) in the geometric model to the identified detected object part(s) by minimizing an error between the mapped object part(s) and the identified detected object part(s). The processing circuitry is further operative to determine, for at least a portion of the determined search locations and if the error is smaller than a threshold value and for the object, an object location representation defining a region of the picture based on the homography and the geometric model.

Further aspects of the invention relate to a user device and a network node comprising an object locator according to above.

A further aspect of the invention relates a computer program comprising instructions, which when executed by at least one processing circuitry, cause the at least one processing circuitry to apply at least one object detector to a picture to detect object parts in the picture and generate, for each detected object part, a part location representation defining a region of the picture. The at least one processing circuitry is also caused to estimate a size of an object comprising object parts in the picture based on a geometric model of the object and of the object parts and based on the part location representations. The at least one processing circuitry is further caused to determine, based on the part location representations, search locations in the picture for a search window having a size that is based on the estimated size of the object. The at least one processing circuitry is caused to identify, for at least a portion of the determined search locations, any detected object part within the search window positioned at the determined search location. The at least one processing circuitry is also caused to estimate, for at least a portion of the determined search location, a homography mapping object part(s) in the geometric model to the identified detected object part(s) by minimizing an error between the mapped object part(s) and the identified detected object part(s). The at least one processing circuitry is further caused to determine, for at least a portion of the determined search locations and if the error is smaller than a threshold value and for the object, an object location representation defining a region of the picture based on the homography and the geometric model.

Yet another aspect of the invention relates to a computer program product having stored thereon a computer program comprising instructions which, when executed on a processing circuitry, cause the processing circuitry to apply at least one object detector to a picture to detect object parts in the picture and generate, for each detected object part, a part location representation defining a region of the picture. The processing circuitry is also caused to estimate a size of an object comprising object parts in the picture based on a geometric model of the object and of the object parts and based on the part location representations. The processing circuitry is further caused to determine, based on the part location representations, search locations in the picture for a search window having a size that is based on the estimated size of the object. The processing circuitry is caused to identify, for at least a portion of the determined search locations, any detected object part within the search window positioned at the determined search location. The processing circuitry is also caused to estimate, for at least a portion of the determined search location, a homography mapping object part(s) in the geometric model to the identified detected object part(s) by minimizing an error between the mapped object part(s) and the identified detected object part(s). The processing circuitry is further caused to determine, for at least a portion of the determined search locations and if the error is smaller than a threshold value and for the object, an object location representation defining a region of the picture based on the homography and the geometric model.

The invention provides a part-based object detection that can be implemented in portable user devices in order to detect object parts and use the detected object parts together with a homography to identify objects in a picture. The computational complexity in determining locations of objects in pictures is reduced according to the invention by enabling usage of simpler object detectors to detect object parts and then employ these detected object parts together with the homography in order to locate the object in the picture.

BRIEF DESCRIPTION OF THE DRAWINGS

The embodiments, together with further objects and advantages thereof, may best be understood by making reference to the following description taken together with the accompanying drawings, in which:

FIG. 1 is an overview of a user device-server architecture with object detection in the server;

FIG. 2 is an overview of a user device comprising at least one object detector;

FIG. 3 schematically illustrates a captured picture comprising objects with object parts;

FIG. 4 illustrates display of the captured picture in FIG. 3 augmented with bounding boxes for the objects and object parts;

FIG. 7 is a flow chart illustrating estimating size of object shown in FIG. 6 according to an embodiment;

FIG. 8 is a flow chart illustrating determining search location shown in FIG. 6 according to an embodiment;

FIG. 9 is a flow chart illustrating determining minimum step size in FIG. 8 according to an embodiment;

FIG. 10 is a flow chart illustrating an additional, optional step of the method shown in FIG. 6 according to an embodiment;

FIG. 11 is a flow chart illustrating an additional, optional step of the method shown in FIG. 6 according to another embodiment;

FIG. 12 is a flow chart illustrating an additional, optional step of the method shown in FIG. 6 according to a further embodiment;

FIG. 13 is a flow chart illustrating additional, optional steps of the method shown in FIG. 6 according to an embodiment;

FIG. 14 is a flow chart illustrating additional, optional steps of the method shown in FIG. 6 according to another embodiment;

FIG. 15 is a flow chart illustrating additional, optional steps of the method shown in FIG. 6 according to a further embodiment;

DETAILED DESCRIPTION

Figure 5:
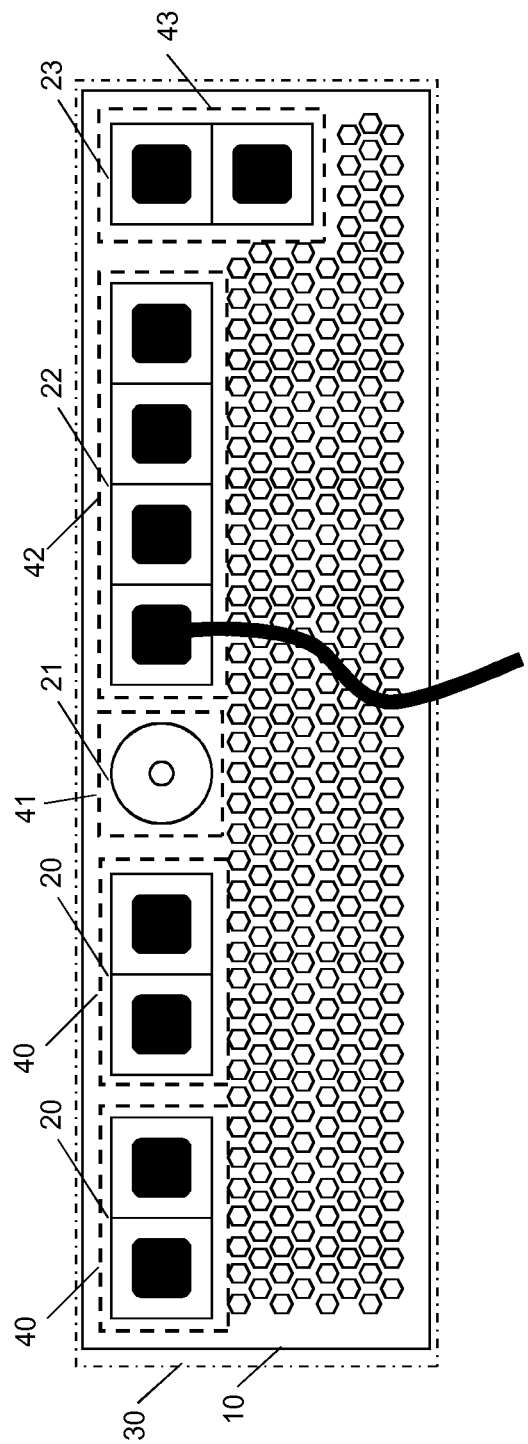
FIG. 5 schematically illustrates a captured picture augmented with bounding boxes for the object and object parts.

Throughout the drawings, the same reference numbers are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention generally relates to a method, an object locator, a computer program, a computer program product and a user device for object location determination in pictures.

A user device—server architecture for augmented reality (AR) is shown in FIG. 1. The user device 1, represented by a portable and wireless user device 1 in FIG. 1, comprises or is connected to a camera 2 used to capture pictures and/or record video. Still images or video frames, for simplicity referred to as pictures herein, may then be sent from the user device 1 to an objection detection (OD) server 5. This picture transmission could involve transmitting selected pictures to the OD server 5 or, for video, streaming a video stream to the OD server 5, i.e., substantially transmitting all the video frames of the video stream to the OD server 5. In an alternative embodiment, individual, typically time-stamped video frames are sent to the OD server 5 for object detection.

The OD server 5 comprises at least one object detector 3 for performing object detection on the received pictures, or at least for a portion thereof. According to the present embodiments, object detection is performed according to so-called part-based object detection. As a consequence, one or more object detectors 3 are used to detect parts of objects, denoted object parts herein. Once such object parts have been detected, they can be used to detect or identify objects comprising such object parts in the picture. Part-based object detection could involve using multiple, i.e., at least two, object detectors 3. Each such object detector 3 may then be configured to detect a single type, typically referred to as class in the art, of object parts or a group or set of related classes of object parts. As an illustrative example, classes of object parts could include, for instance, tire, headlights, tail lights, windshield, bumper, etc. with car or motor vehicle as the object. FIG. 3 illustrates another example of objects 10A, 10B in the form of a control board of a music player comprising various symbols as object parts 20A, 20B, 21A, 21B, 22B, 23B, 24A, 24B.

An object detector used to detect a class of object parts in a part-based object detection has advantages over general object detectors required to detect various classes of unrelated objects, such as car, pedestrian, house, etc. Firstly, the accuracy in the detection of object parts is generally higher as compared to detecting unrelated objects of various classes. The reason being that the object detector is trained for a specific class of object parts and is thereby dedicated or specialized for detection of object parts of this specific class. General object detectors on the other hand need to be trained to be able to detect a plurality of different and unrelated objects in pictures. Secondly, training of an object detector dedicated to detect a single class of object parts is typically much easier and requires less training data as compared to training general object detectors. Thirdly, the complexity of a dedicated object detector is typically less as compared to a general object detector.

This object detection performed in the OD server 5 in FIG. 1 involves detecting object parts in a processed picture and determining information of the detected object parts, including location representations and typically also detection probability and class. Part location representation as used herein denotes a location representation for a detected object part. The part location representation, also referred to as bounding box of a detected object part in the art, defines a region of or within the processed picture. Detection probability represents a likelihood that the region of or within the picture defined by the part location representation comprises an object part. Class defines the type or class of the detected object part.

This so-called detection information, i.e., part location representation, and optionally detection probability and class, is returned to the user device 1, optionally together with an indication of for which picture the object detection has been performed, such as in terms of a timestamp of the relevant picture. The detection information is then used by the user device 1 for augmentation of a picture presented on a screen 4. FIG. 4 schematically illustrates the screen 4 of the user device 1 with the picture shown in FIG. 3 augmented with bounding boxes 40A, 40B, 41A, 41B, 42B, 43B, 44A, 44B around the detected object parts 20A, 20B, 21B, 22B, 23B, 24A, 24B and bounding boxes 30A, 30B around the objects 10A, 10B.

In another implementation example, the at least one objection detector 3 is implemented in the user device 1 as shown in FIG. 2. Hence, then the user device 1 comprises both the camera 2 used to capture the picture and the at least one object detector 3 that processes pictures for the purpose of detecting object parts therein. This implementation thereby relaxes the need for transmitting pictures to a remote OD server 5 and receiving the detection information therefrom but instead requires implementation of the at least one object detector 3 including offline trained object detection model(s) used by the at least one object detector 3 at the user device 1. This a preferred implementation embodiment, especially for real-time AR applications since no transmission of pictures to a remote OD server 5 and reception of detection information therefrom is required.

Augmented reality finds ever more applications in portable user devices 1. A typical example is industrial AR applications, in which AR constitutes a support tool for technicians fixing complex hardware system. In such scenarios, the object detection should run in real-time, typically on the portable user device 1, which imposes limitations on the complexity of the object detection. An example of such a hardware system is shown in FIG. showing a baseband switcher 10 comprising a number of ports 20, 21, 22, 23 as object parts. The FIG. also shows how the detected object parts 20, 21, 22, 23 and the identified object 10 are augmented with bounding boxes 30, 40, 41, 42, 43. Further illustrative, but non-limiting, examples of such hardware systems include server racks and front-end and back-end switchers having respective switch ports.

The present invention provides a solution of implementing AR applications in portable user devices 1 by utilizing at least one object detector to detect object parts and then uses the detection information for the detected object parts to search for objects in the picture. This allows AR applications to run in real-time in portable user devices 1 and enables visualization of positions of objects and object parts in real time.

Figure 6:
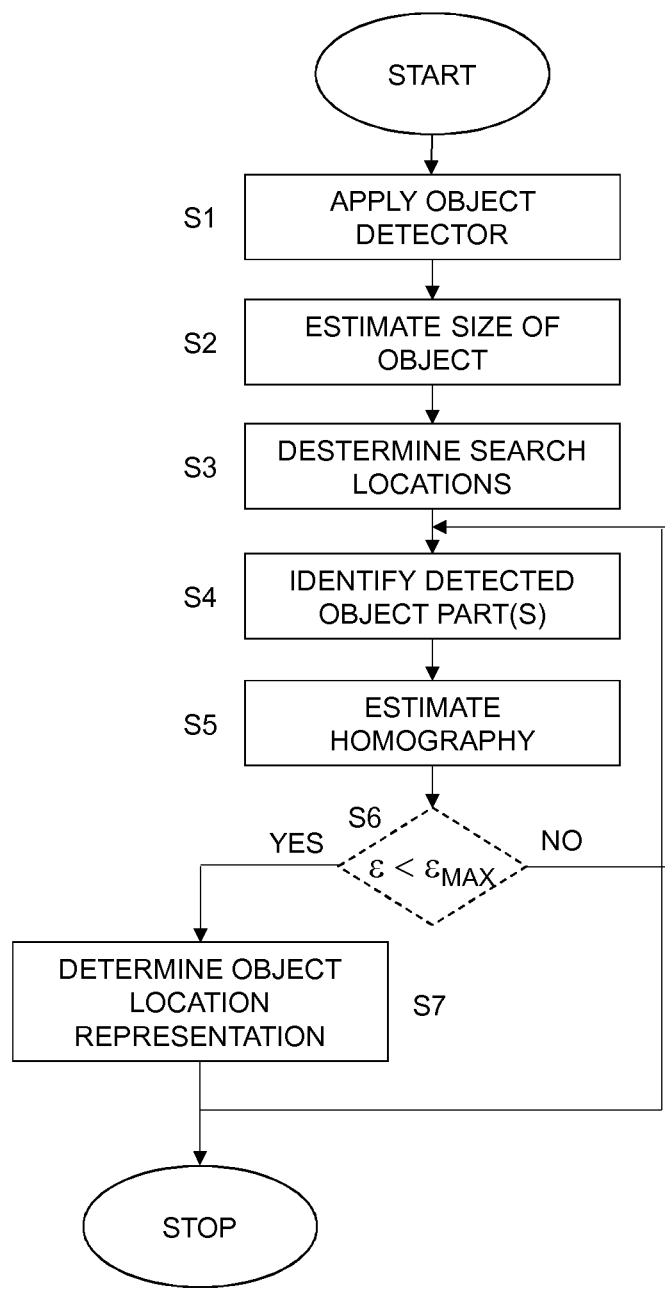
FIG. 6 is a flow chart illustrating an object locating method according to an embodiment.

FIG. 6 is a flow chart illustrating an object locating method according to an embodiment. The method comprises applying, in step S1, at least one object detector to a picture to detect object parts in the picture and generate, for each detected object part, a part location representation (a location representation of the detected object part) defining a region of the picture.

Picture as used herein include both still images and still pictures and pictures or video frames of a video stream.

A next step S2 comprises estimating a size of an object comprising object parts in the picture based on a geometric model of the object and of the object parts and based on the part location representations. The method also comprises determining, in step S3 and based on the part location representations, search locations in the picture for a search window having a size that is based on the estimated size of the object. The following steps S4, S5 and S7 and optional step S6 are then performed for at least a portion of the search locations determined in step S3, which is schematically shown in FIG. 6.

Step S4 comprises identifying any detected part within the search window positioned at the determined search location. A homography mapping object part or parts in the geometric model to the detected object part or parts identified in step S4 is estimated in step S5 by minimizing an error between the mapped object part or parts and the identified detected object part or parts. Step S7 then comprises determining, if the error ($\varepsilon$) is smaller than a threshold value ($\varepsilon_{MAX}$) and for the object, an object location representation (a location representation of the object) defining a region of the picture based on the homography and the geometric model.

The object locating method thereby only needs to use one or more object detectors for the object parts, which means that the method is less resource demanding at execution time as compared to other object detection solutions that also require object detectors for the objects. As a consequence, computationally simpler object detectors can be used instead of very complex models. The execution time of the objection detection can thereby be reduced and the memory requirements for the object detectors are less, which means that the method can be used to locate objects using portable user devices at acceptable frame rates.

Hence, one or multiple object detectors are applied to a picture in order to detect any object parts in the picture in step S1. This step S1 could include using one object detector capable of detecting object parts of different, but typically related, classes. As an alternative different object detectors dedicated for detecting object parts of a specific class or a group or set of classes could be used in step S1. In such case, each object detector detects any object parts for which it is trained and outputs respective part location representations for the detected object parts. This further means that part location representations could be generated in step S1 from multiple object detectors depending on which particular part objects are present in the picture.

The part location representations generated in step S1 are then used in step S2 to estimate a size of an object present in the picture and comprising object parts. The object could comprise all the object parts detected in step S1 or merely a portion thereof. For instance and as shown in FIG. 3, a picture could contain more than one object 10A, 10B and therefore not all detected object parts 20A, 20B, 21A, 21B, 22B, 23B, 24A, 24B belong to one object 10A, 10B. The size estimated in step S2 corresponds to an actual size of the object in the picture as determined based on the generated part location representations and the geometric model.

The geometric model in turns defines the geometry of an object and its included object parts. The geometric model can be created using an ideal image or picture of the object. The geometric model can be generated during a training phase, in which the at least one object detector employed in the part-based object detection is trained for the object parts. An example of such an ideal picture that can be used to create a geometric model of an object 10 is shown in FIG. 5. In FIG. 5, object parts of a same class are indicated using the same reference number. Hence, an object 10 can include one or multiple object parts 20 of a same class either alone or together with one or multiple object parts 21, 22, 23 of one or more other classes. During the training phase when the geometric model is created, the bounding boxes 30, 40, 41, 42, 43 can be manually created around the object 10 and its object parts 20, 21, 22, 23.

In an embodiment, a respective geometric model is created for each orientation of the object 10. For instance, a first geometric model can be created for the object 10 and its object parts 20, 21, 22, 23 when arranged horizontally as shown in FIG. 5, and further geometric models can be created for different rotations (rotation angles) of the object 10.

In an illustrative example, the geometric model describes the object 10 and its object parts 20, 21, 22, 23 and may comprise the location and dimension of the object 10 in a picture, i.e., an object location representation, and optionally also the class of the object 10. Mathematically, the object 10 can therefore be described by the tuple o=(x, y, w, h) or o=(c, x, y, w, h), wherein (x, y) defines a position of a region within the picture, such as a corner of a bounding box 30, typically the upper left corner, or a center of a bounding box 30, and (w, h) defines the size of the region within the picture, such as the width and height of a bounding box 30. The optional parameter c defines the class of the object 10. In alternative embodiments, the object 10 is instead described by the tuple o=(x1, y1, x2, y2) or o=(c, x1, y1, x2, y2) wherein (x1, y1) and (x2, y2) define, for instance, opposite corners of a bounding box 30, such as upper left corner and lower right corner.

A corresponding tuple is preferably also included in the geometric model for each object part 20, 21, 22, 23 of the object 10, i.e., $p_i=(x_{p_i}, y_{p_i}, w_{p_i}, h_{p_i})$, $p_i=(c_{p_i}, x_{p_i}, y_{p_i}, w_{p_i}, h_{p_i})$, $p_i=(x1_{p_i}, y1_{p_i}, x2_{p_i}, y2_{p_i})$ or $p_i=(c_{p_i}, x1_{p_i}, y1_{p_i}, x2_{p_i}, y2_{p_i})$, wherein $p_i$ denotes an object part 20, 21, 22, 23, i=1 ... N and N represents a total number of object parts 20, 21, 22, 23 in the object 10.

The size as estimated in step S2 based on the geometric model and the part location representations generated in step S1 represents an actual or current size of the object 10 in the picture. Hence, the generated part location representations are used together with matching part location representations from the geometric model in order to estimate the current size of the object 10. This estimated size of the object 10 is then used to define a size of a search window that is employed in order to search for and identify the object 10 in the picture. According to the present invention, search locations for the search window are determined in step S3 based on the part location representations generated in step S1.

At least a portion of the determined search locations are then interrogated in steps S4 to S7 as shown in FIG. 6. This means that for each determined search location of the at least a portion of the determined search location, the search window is positioned at the (current) search location and any object part detected in step S1 that is within the search window at this determined search location is identified in step S4. The identified detected part locations within the search window are then used in step S5 in order to estimate the homography.

Generally, a homography, also referred to as projectivity, projective transformation or projective collineation in the art, is an isomorphism of projective spaces, induced by an isomorphism of the vector spaces from which the projective spaces derive. It is a bijection that maps lines to lines, and thus a collineation. A projective space P(V) of dimension n over a field K may be defined as the set of the lines through the origin in a K-vector space V of dimension n+1. Given two projective spaces P(V) and P(W) of the same dimension, an homography is a mapping from P(V) to P(W), which is induced by an isomorphism of vector spaces $f:V \rightarrow W$. Such an isomorphism induces a bijection from (V) to P(W), because the linearity of $f$. A homography H may be defined by a nonsingular n+1×n+1 matrix $[h_{ij}]$ called the matrix of the homography. The homogenous coordinates $[x_1: \ldots : x_{n+1}]$ of a point and the coordinates $[y_1: \ldots : y_{n+1}]$ of its image by H are related by:

$$y_1 = h_{11}x_1 + \cdots h_{1(n+1)}x_{n+1}$$
$$\vdots$$
$$y_{n+1} = h_{(n+1)1}x_1 + \cdots h_{(n+1)(n+1)}x_{n+1}$$

Hence, the homography estimated in step S5 maps one or more object parts in the geometric model to the detected object part or parts identified in step S4. The homography estimated in step S5 is then used in step S7 to determine the object location representation of the object based on the geometric model if $\varepsilon < \varepsilon_{MAX}$. This comparison between the error and the threshold value is preferably performed in step S6, which comprises comparing the error with the threshold value. Then if the error is smaller than the threshold value, the method continues to step S7. If the error is equal to or larger than $\varepsilon_{MAX}$, the method continues to step S4 to test a new determined search location or ends if all search locations have been tested.

The actual value of the threshold can be determined in an optimization procedure. For instance, a value of $\varepsilon_{MAX}$ equal to 100 works well with pictures of 640×360 pixels.

The loop of steps S4 to S7 or S4 to S5/S6 is then performed for each determined search location of the at least a portion of the determined search locations. As a result, zero, one or multiple object location representations may be determined for a single picture. For instance, FIG. 4 illustrates an example with a picture of two objects 10A, 10B. This means that two object location representations 30A, 30B will be determined for that particular picture.

Once all relevant search locations have been interrogated the method ends or continues by processing another picture and then returns to step S1.

The object locating method is in an embodiment a context-based object detection in terms of using characteristics of the objects and object parts in order to computationally simplify the method and thereby allow implementation of the method in user devices. Hence, in an embodiment the object is preferably a planar object with the object parts in the same plane. The above described and in FIGS. 3 to 5 illustrated examples of object and object parts are all substantially planar objects with object parts in the same plane. Furthermore, the object parts are preferably rigid in context of not being deformable.

The object locating method of the invention thereby enables location of rigid objects and object parts at real time on portable user devices, which is very difficult with object detectors based on CNN or with general deformable part-based models.

FIG. 7 is a flow chart illustrating an embodiment of step S2 in FIG. 6 in more detail. This embodiment comprises calculating a scaling factor in step S10 based on the part location representation. This scaling factor is used together with a default size of the object defined by the geometric model to determine the size of the object in step S11. The method then continues to step S3 in FIG. 6.

In a particular embodiment, step S10 comprises calculating the scaling factor $$s = f\left(\sqrt{\frac{w_{d_i} \times h_{d_i}}{w_{p_i} \times h_{p_i}}}\right).$$

In this embodiment, $(w_{d_i}, h_{d_i})$ represents width and height of the region of the picture defined by a part location representation for a detected object part $d_i$, $(w_{p_i}, h_{p_i})$ represents width and height of a region defined by a part location representation for an object part $p_i$ from the geometric model, $f( )$ is a function, $i=1 \ldots N$ and N represents the number of detected object parts.

In this embodiment, the size of a region of the picture defined by a part location representation is represented by $(w_{d_i}, h_{d_i})$. Hence, $w_{d_i} \times h_{d_i}$ corresponds to the area of this region. If the size of the region is instead represented by the coordinates of opposite corners of the region, such as bounding box, then the equation for calculating the scaling factor is adapted accordingly, i.e., by replacing $w_{d_i} \times h_{d_i}$ with $(x2_{d_i} - x1_{d_i}) \times (y2_{d_i} - y1_{d_i})$. Hence, in a general embodiment, the scaling factor is calculated as a function of the square root of the quotient between the area of the region of the picture defined by a part location representation for a detected object part and the area of the region defined by a part location representation from the geometric model. The object part $p_i$ from the geometric model is a corresponding or mapped object part with regard to the detected object part $d_i$. This means that the object part $p_i$ and the detected object part $d_i$ are of a same class.

In an embodiment, the function $f( )$ is the median, i.e., $$s = \underset{1 \leq i \leq N}{\text{median}}\, s_i = \underset{1 \leq i \leq N}{\text{median}}\, \sqrt{\frac{w_{d_i} \times h_{d_i}}{w_{p_i} \times h_{p_i}}}.$$

In another embodiment, the function $f( )$ is the mean, i.e., $$s = \frac{1}{N}\sum_{i=1}^{N} s_i.$$

The scaling factor as calculated in step S10 is then used in step S11 to determine the size of the object together with the geometric model. In an embodiment, the size of the object is determined by multiplying the default size of the object as defined by the geometric model with the scaling factor, such as $(w_s, h_s) = (s \times w, s \times h)$ or $s \times (x2-x1, y2-y1)$.

The size of the search window is then determined based on the size of the object as determined in step S11. In a preferred embodiment, the size of the search window is equal to the size of the object. In this embodiment, the size of the search window is $(w_s, h_s)$ or $s \times (x2-x1, y2-y1)$. In another embodiment, the size of the search window is a function g( ) of the size of the object, such as a scaled version of the size of the object $k \times (w_s, h_s)$ or $k \times s \times (x2-x1, y2-y1)$, where k is a positive scaling factor.

FIG. 8 is a flow chart illustrating an embodiment of step S3 in FIG. 6. This embodiment comprises determining a grid $\{x_{d_i}, y_{d_j}\}$ of search locations in the picture in step S20. In this embodiment, $(x_{d_i}, y_{d_j})$ represents a coordinate of the region of the picture defined by a part location representation for a detected object part $d_i$, $1 \le i, j \le N$ and N represents the number of detected object parts.

Figure 17:
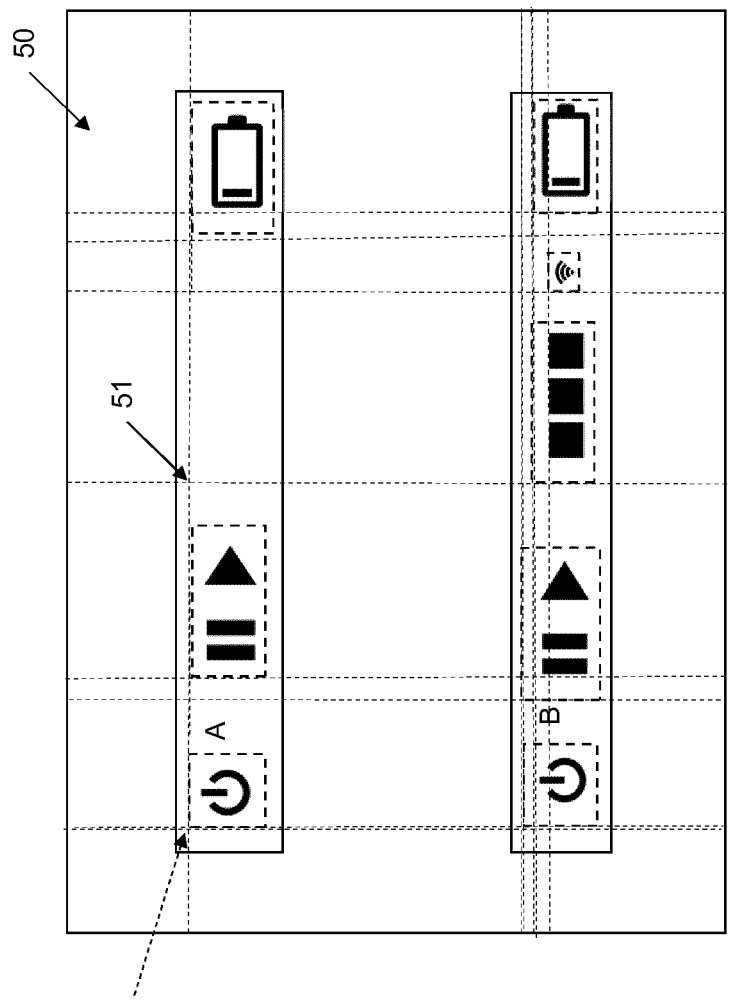
FIG. 17 schematically illustrates a picture with a grid of search locations.

FIG. 17 illustrates a picture showing the two objects also shown in FIGS. 3 and 4 but also the grid 50 of search locations 51. In order to avoid having to use each pixel in the picture as potential search location and thereby reduce the processing complexity and time of the method, the coordinates of the regions of the picture defined by the part location representations for the detected object parts are used to generate possible search locations. In a particular embodiment, $(x_{d_i}, y_{d_j})$ represents the upper left corner of a region of the picture (bounding box). This means that the search locations for the search window and the grid 50 is defined by the x and y coordinates of the, preferably upper left corner of, the regions of the detected object parts. This approach significantly reduces the number of search location.

In a further embodiment, an additional reduction in the number of search locations is achieved by determining a minimum step size for the search window. This further embodiment is illustrated in step S21 in FIG. 8. This step S21 comprises determining a minimum step size $x_{step}$ in the x direction and a minimum step size $y_{step}$ in the y direction. The minimum step sizes are determined in step S21 based on the part location representations.

The method then continues to step S4 in FIG. 6. In such an embodiment, steps S4 and S5 are performed for search locations of the grid having a distance, in the x direction, to a neighboring search location in the grid equal to or exceeding $x_{step}$ and having a distance, in the y direction, to a neighboring search location in the grid equal to or exceeding $y_{step}$.

The search window is preferably slid or moved in a left-to-right and top-to-bottom direction. This means that when moving the sliding window horizontally between search locations 51 in the grid 50, consecutive search locations are ignored if the step size $\Delta x$ is smaller than $x_{step}$. Correspondingly, when moving the sliding window vertically between search locations 51 in the grid, consecutive search locations are ignored if the step size $\Delta y$ is smaller than $x_{step}$.

Search location $(x_{d_{i+1}}, y_{d_j})$ is a neighboring search location in the grid with regard to search location $(x_{d_i}, y_{d_j})$ when moving in the horizontal direction. Correspondingly, search location $(x_{d_i}, y_{d_{j+1}})$ is a neighboring search location in the grid with regard to search location $(x_{d_i}, y_{d_j})$ when moving in the vertical direction. In this example, the detected object parts are ordered in the left to right and top to bottom order.

The hatched arrow in FIG. 17 points towards two search locations that lie very close to each other in the grid 50. Generally, it is not necessary to test both these search locations in steps S4 to S7 since the result would in both cases be substantially the same due to the close proximity of the two search locations in the picture. Hence, the usage of minimum step sizes in the horizontal or x direction and in the vertical or y direction even further reduces the number of search locations that are interrogated when sliding the search window through the picture.

FIG. 9 is a flow diagram illustrating an embodiment of step S21 in FIG. 8. In this embodiment, step S21 comprises calculating, in step S30, $$x_{step} = \frac{1}{Z} \min_{1 \le i \le N} w_{d_i}$$

and calculating, in step S31, $$y_{step} = \frac{1}{Z} \min_{1 \le i \le N} h_{d_i}.$$

In this embodiment, Z is a positive number larger than one and $(w_{d_i}, h_{d_i})$ represents width and height of the region of the picture defined by a part location representation for a detected object part $d_i$ and N is as defined above, i.e., represents the number of detected object parts. Steps S30 and S31 can be performed serially in any order or at least partly in parallel. In this embodiment, the minimum step size in the x direction is 1/Z of the minimum width of the regions defined by the part locations for the detected object parts. Correspondingly, the minimum step size in the y direction is 1/Z of the minimum height of the regions defined by the part locations for the detected object parts.

If the size of the regions are instead represented by the difference between two coordinates $w_{d_i}$ is replaced by $x2_{d_i} - x1_{d_i}$ and $h_{d_i}$ is replaced by $y2_{d_i} - y1_{d_i}$ in the two equations.

The actual value of the parameter Z can be determined in an optimization procedure. A value of 2 has been shown to produce good results in terms of accuracy and low computational complexity.

In an embodiment, step S5 is performed if, and preferably only if, the detected object part or parts identified in step S4 form or forms at least a minimal identifying group defined by the geometric model and constituting a distinctive group of object parts uniquely defining the object as determined in an optional step S40 as shown in FIG. 10.

In this embodiment, the geometric model comprises a list of one or more minimal identifying groups or subsets of object parts that uniquely define the object. As an example and with reference to FIG. 5, there might be different types of baseband switchers 10 having different number of ports 20, 21, 22, 23, different types of ports 20, 21, 22, 23 and/or different placements of the ports 20, 21, 22, 23 in the baseband switcher 10. In such a case, a subset of the ports 20, 21, 22, 23 could be used to uniquely identify one type of baseband switcher 10 and differentiate it from other types of baseband switchers 10. For instance, a first type of baseband switcher 10 could have a circular port 21 positioned between an object part 20 with two horizontal ports and an object part 22 with four horizontal ports 22, whereas other types of baseband switchers have the circular port in the upper right corner next to the object part 23 with two vertical ports. In such a case, the object parts 20, 21 could constitute a minimal identifying group uniquely defining the particular type of baseband switcher 10 with the object parts 21, 22 constituting another minimal identifying group for this particular type of baseband switcher 10.

The geometrical model may, thus, comprise a single minimal identifying group or multiple different minimal identifying groups for one and the same object.

This means that this embodiment comprises determining whether at least the object parts constituting at least one minimal identifying group have been identified in step S4 to be within the search window at the current search location. For instance, at a first search location the search window could include the object parts 20 shown in FIG. 5. These two object parts 20, however, do not constitute a minimal identifying group for the object 10. At a second search location, the search window includes object parts 20, 21, which according to above constitute a minimal identifying group for the object 10. This means that step S5 is performed for the second search location but preferably not for the first search location. This approach further reduces the complexity of the method by not estimating the homography at search locations where the search window does not include objects parts that enable determination of the particular class of the object.

In an alternatively, or preferably additional, embodiment, step S5 is performed if, and preferably only if, the search window does not comprise any identified object part not belonging to the object as determined in an optional step S41 as shown in FIG. 11. The verification whether an identified object part belongs to the object or not can be performed using the geometric model of the object that defines the object parts that the object should include. If an identified object part does not correspond to any of the object parts defined in the geometric model of the object then that identified object part does not belong to the object. The verification of object parts could be performed based on the classes of the object parts.

For instance, an object part in the form of 2×2 ports present within a search window does not form part of an object 10 as shown in FIG. 5. In such a case, the search window is not positioned in the picture aligned with or overlapping with the object 10 but most probably at least partly overlapping another object in the picture.

The conditional estimation of the homography depending on whether the search window comprises object parts not belonging to the object reduces the number of search locations that need to be interrogated.

FIG. 12 is a flow chart illustrating an additional, optional step of the method shown in FIG. 6. The method continues from step S6 or S7 in FIG. 6. Step S50 is performed for the at least a portion of the determined search locations and if the error is smaller than the threshold value. Step S50 comprises determining an additional part location representation defining a region of the picture for any object part of the object not present among the part location representations of the detected object part based on the homography and the geometric model.

Figure 18:
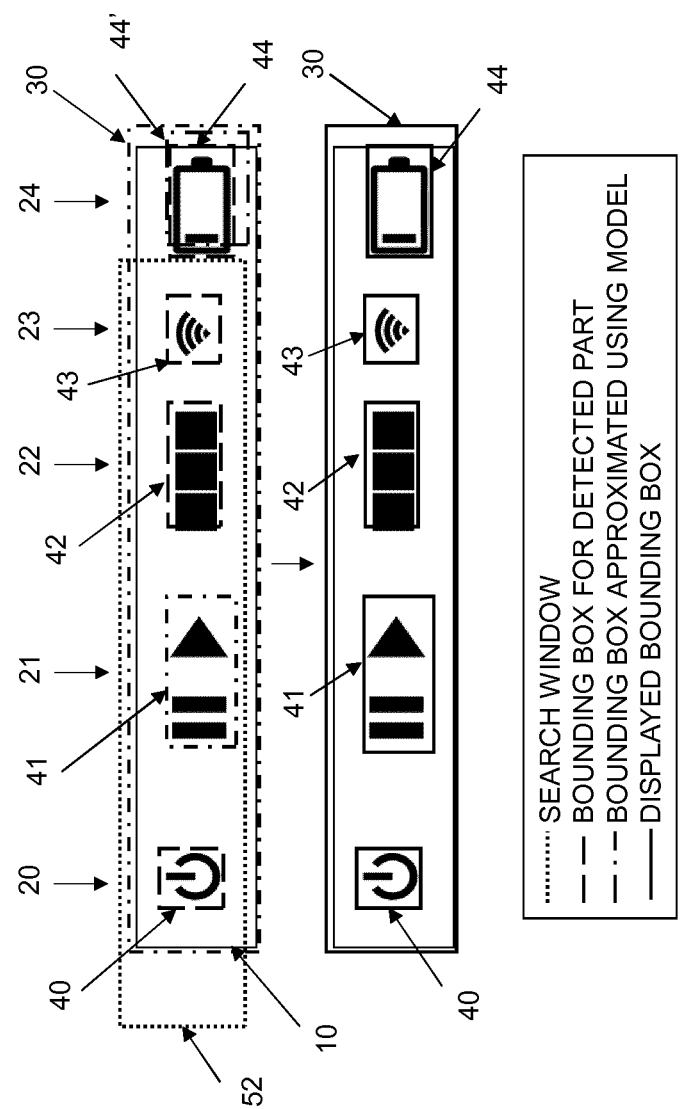
FIG. 18 schematically illustrates a search window at a search location together with bounding boxes for detected object parts and approximated bounding boxes (top) and the object augmented with bounding boxes (bottom)

For instance, FIG. 18 illustrates an object 10 comprising five object parts 20, 21, 22, 23, 24. Assume that object parts 20, 22, 23 and 24 where detected in step S1 but not the object part 21. A reason for this could be that object part 21 was completely or at least partly occluded or hidden when the picture was taken. Hence, no object detector used in step S1 was able to detect the object part 21 in the picture. FIG. 18 also indicates the search window 52 positioned at a determined search location to include the detected object parts 20, 22, 23 but not the detected object part 24 as this latter is outside of the search window 52.

The geometric model of the object 10 defines that the object 10 should include five object parts 20, 21, 22, 23, 24 and also their relative sizes and positions relative to the object 10. The geometric model can then be used together with the homography to map object part 21 from the geometric model to determine the additional part location representation for the non-detected object part 21. Thus, the geometric model defines that there should be an object part in between object part 20 and object part 22 even if this object part 21 was not detected in step S1. As a consequence, the part location representation for this non-detected object part 22 forming part of the object 10, which is denoted additional part location representation herein, can be determined in step S50 by applying the homography onto the coordinates of the object part 21 retrieved from the tuple for that object part 21 in the geometric model.

Depending on the position of the search window, the accuracy of the at least one object detector applied in step S1 and whether any occlusion of at least a portion of the object occurred during taking the picture or recording the video of the object, zero, one or multiple additional part location representations could be determined in step S50.

FIG. 13 is a flow chart of additional, optional steps of the method illustrated in FIG. 6 according to an embodiment. In this embodiment, the method continues from step S1 in FIG. 6. A next step S60 comprises creating a list $L_{part}$ of the object parts detected in step S1. Step S61 correspondingly comprises creating a list $L_{display}$ of location representations to be displayed. The two steps S60 and S61 can be performed serially in any order or at least partly in parallel. The list $L_{display}$ comprises part location representations of the object parts detected in step S1. The method then continues to step S2 in FIG. 6. In this embodiment, step S4 of FIG. 6 comprises identifying any detected object part from $L_{part}$ within the search window positioned at the search location.

The list $L_{part}$ is used to keep track of object parts in the picture and the list $L_{display}$ comprises location representations, such as bounding boxes, which are to be displayed onto the picture during the augmentation step.

FIG. 14 is a flow chart illustrating additional, optional steps of the method illustrated in FIG. 6 according to an embodiment. The method continues from step S6 in FIG. 6. In this embodiment, see also FIG. 18, step S70 comprises discarding an additional part location representation 44' overlapping with a part location representation 44 of a detected object part 24 outside of the search window 52 positioned at the determined search location. The embodiment also comprises removing, in step S71 and from the list $L_{part}$, the detected object part 24 having a part location representation 44 overlapping with the discarded additional part location representation 44'. Any non-discarded additional part location representation 41, i.e., remaining additional part location representation following the discarding operation in step S70, is then added to the list $L_{display}$. Finally, the detected object part or parts 20, 22, 23 identified in step S4 are removed from the list $L_{part}$.

Step S70 is preferably performed in order to avoid creating multiple part location representations 44, 44' for the same object part 24. FIG. 18 schematically illustrates this scenario where the part location representation 44 around the object part 24 is generated in step S1, i.e., during the object detection step, whereas the part location representation 44' is a so-called additional part location representation determined as previously described herein in connection with step S50. As shown in the upper part of FIG. 18, there are therefore two part location representations 44, 44' positioned around this object part 24. However, when augmenting the picture with location representations or bounding boxes 30, 40, 41, 42, 43, 44 as shown in the lower part of FIG. 18, only a single location representation or bounding box 30, 40, 41, 42, 43, 44 should preferably be displayed around each object part 20, 21, 22, 23, 24 and each object 10. Step S70 therefore removes any additional part location representation 44' determined in step S50 when there is already a part location representation 44 generated for the object part 24.

The verification or check whether an additional part location representation 44' is overlapping with a part location representation 44 is in an embodiment not only done for part location representations 44 outside of the search window 52 positioned at the determined search location. In this embodiment, also part location representations inside the search window 52 are checked to see if any additional part location representation 44' is overlapping with such a part location representation inside the search window. In such a case, step S70 in FIG. 14 comprises discarding an additional part location representation 44' overlapping with a part location representation 44 of a detected object part 24.

Once any discarding of additional part location representations 44' is conducted in step S70, the detected object part 24 having a generated part location representation 44 overlapping with the discarded additional part location representation 44' is removed from the list $L_{part}$ in step S71 to indicate that this object part 24 has already been processed and its part location representation is already present in the list $L_{display}$ where it was added in step S61.

Any remaining, i.e., non-discarded, additional part location representations 41 as determined in step S50 are then added to the list $L_{display}$ in step S72. FIG. 18 illustrates one such additional part location representation 41 for an object part 21 that was not detected in step S1. The addition of such additional part location representations 41 to the list $L_{display}$ means that also object parts 21 that were not detected, such as due to complete or partly occlusion when the picture was taken or the video was recorded, will be augmented by applying the homography to the geometric model.

Finally, step S73 removes all detected object part or parts identified in step S4 from the list $L_{part}$ to indicate that they have already been processed and that their part location representations are already present in the list $L_{display}$.

FIG. 15 is a flow chart illustrating an embodiment of determining whether part location representations are overlapping. The method continues from step S6 in FIG. 6. A next step S80 comprises calculating an intersection over union (IoU) for an additional part location representation 44' and a part location representation 44 of a detected object part 24 outside of the search window 52 positioned at the determined search location. A next step S81 comprises determining the additional part location representation 44' to be overlapping with the part location representation 44 of the detected object part 24 if the IoU exceeds a threshold value.

Figure 19:
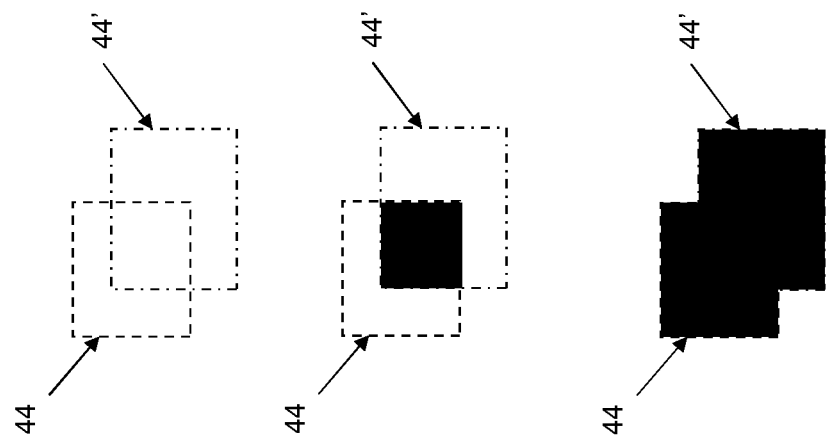
FIG. 19 schematically illustrates overlapping part locations and calculation of intersection over union (IoU)

In an embodiment, see FIG. 19, the IoU is calculated as the quotient between i) the area of overlap between the part location representation 44 and the additional part location representation 44' and ii) the area of union between the part location representation 44 and the additional part location representation 44'. The upper part of FIG. 19 illustrates overlapping part location representation 44 and additional part location representations 44'. The middle part of FIG. 19 illustrates the area of overlap whereas the lower part of FIG. 19 illustrates the area of union.

The actual threshold value used in the comparison with the IoU can be determined in an optimization procedure. A value of the threshold value of 0.4 has proved to give good results.

In an embodiment, step S7 in FIG. 6 comprises mapping an object location representation from the geometric model into the object location representation defining a region of the picture based on the homography. Hence, in this embodiment the homography estimated in step S5 is used, if the error is smaller than the threshold value, to map the object location representation from the geometric model into the picture to thereby get the object location representation for the object.

Figure 16:
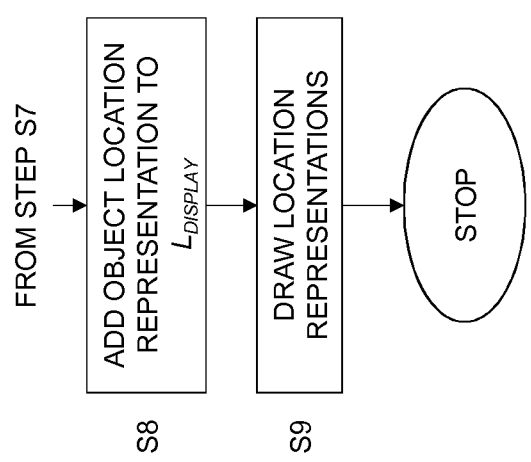
FIG. 16 is a flow chart illustrating additional, optional steps of the method shown in FIG. 6 according to various embodiments.

The object location representation for the object is then preferably added in step S8 of FIG. 16 to the list $L_{display}$. This means that the list $L_{display}$ comprises part location representations generated in step S1, optionally any additional part location representations determined in step S50 and not discarded in step S70 and the object location representation determined in step S7. In fact, the list $L_{display}$ may comprise the above mentioned location representations for multiple objects and their respective object parts if the picture contained more than one object, as shown in FIG. 4.

FIG. 16 also illustrates an additional step S9, which comprises drawing location representations, i.e., part location representations, any additional part location representations and object location representations, in the list $L_{display}$ onto the picture. This is shown in the lower part of FIG. 18, in which the part location representations 40, 42, 43, 44, the non-discarded additional part location representation 41 and the determined object location representation 30 are drawn onto the picture to thereby position the location representations 30, 40, 41, 42, 43, 44, represented as bounding boxes in the figure, around the respective object parts 20, 21, 22, 23, 24 and the object 10.

The picture may, thus, be augmented with perceptual information based on the location of the at least one object and the object parts in the picture. The augmented picture may then be output for display on a screen of the user device. Thus, by using the location representations of any objects and object parts, the picture can be augmented with perceptual information based on the locations of the objects and object parts. In a particular embodiment, the type of perceptual information to augment the picture can be selected based on the classes of the objects and object parts.

Perceptual information as used herein relates to any information or data that could be used to augment a scene. Non-limiting, but illustrative, examples of such perceptual information includes name of a detected building, name of a detected person, etc. Examples of perceptual information could be bounding boxes 30, 40, 41, 42, 43 around the objects 10 and object parts 20, 21, 22, 23 as shown in FIG. 5. The visualized bounding boxes 30, 40, 41, 42, 43 may optionally be complemented with information or identifiers of the objects 10 and object parts 20, 21, 22, 23 enclosed by the bounding boxes 30, 40, 41, 42, 43. This information or identifiers could, for instance, identify the name or type of ports in the baseband switcher 10.

In an embodiment, step S5 in FIG. 6 comprises estimating the homography $$H = \begin{bmatrix} h_{11} & h_{12} & h_{13} \\ h_{21} & h_{22} & h_{23} \\ h_{31} & h_{31} & h_{31} \end{bmatrix}$$

by minimizing the squared error, also referred to as reprojection error in the art, $$\varepsilon = \sum_{i=1}^{M} \left( x_i' - \frac{h_{11}x_i + h_{12}y_i + h_{13}}{h_{31}x_i + h_{32}y_i + h_{33}} \right)^2 + \left( y_i' - \frac{h_{21}x_i + h_{22}y_i + h_{23}}{h_{31}x_i + h_{32}y_i + h_{33}} \right)^2.$$

In this embodiment, $(x_i, y_i)$, $1 \leq i \leq M$ represents a coordinate of a part location representation from the geometric model, $(x'_i, y'_i)$, $1 \leq i \leq M$ represents a corresponding coordinate of a part location representation of an identified detected object part and M represents the number of coordinates.

Hence, in this embodiment the homography H is a 3×3 matrix of real numbers:

$$H = \begin{bmatrix} h_{11} & h_{12} & h_{13} \\ h_{21} & h_{22} & h_{23} \\ h_{31} & h_{32} & h_{33} \end{bmatrix}$$

Given two pictures containing the same plane, there exists a homography that can map the 2-dimensional coordinates of points from the plane in one picture to their corresponding coordinates in the other picture. Homographies operate on homogeneous coordinates. A point $(x, y)$ from the first picture is transformed into the corresponding point $(x', y')$ in the second picture by multiplying its homogenous representation by H:

$$H \begin{bmatrix} x \\ y \\ 1 \end{bmatrix} = \begin{bmatrix} h_{11}x + h_{12}y + h_{13} \\ h_{21}x + h_{22}y + h_{23} \\ h_{31}x + h_{32}y + h_{33} \end{bmatrix}$$

and recovering the Cartesian representation of the result:

$$x' = \frac{h_{11}x + h_{12}y + h_{13}}{h_{31}x + h_{32}y + h_{33}}$$

$$y' = \frac{h_{21}x + h_{22}y + h_{23}}{h_{31}x + h_{32}y + h_{33}}$$

Given a set of points from the first (source) picture $\{(x_i, y_i): 1 \leq i \leq M\}$ and the corresponding points from the second (destination) picture $\{(x'_i, y'_i): 1 \leq i \leq M\}$, where the same subindex indicates correspondence, a homography for the pictures is estimated by minimizing the squared error:

$$\varepsilon = \sum_{i=1}^{M} \left( x_i' - \frac{h_{11}x_i + h_{12}y_i + h_{13}}{h_{31}x_i + h_{32}y_i + h_{33}} \right)^2 + \left( y_i' - \frac{h_{21}x_i + h_{22}y_i + h_{23}}{h_{31}x_i + h_{32}y_i + h_{33}} \right)^2$$

If the two sets of points are really corresponding to points in the same plane, the minimized value for $\varepsilon$ is small. The minimization of the error can be done using known methods. Illustrative, but non-limiting examples of such methods include direct linear transform (DLT) algorithm, non-linear least square minimization techniques, such as Levenberg-Marquardt algorithm, Gauss-Newton algorithm, and regression techniques, such as random sample consensus (RANSAC).

To get the corresponding points, the object parts in the geometric model are used as the first or source picture and the object parts detected in the picture captured by the user device as the second or destination picture. In an embodiment, four corresponding points are derived from each object part correspondence. Given an object part from the geometric model $p = (x_p, y_p, w_p, h_p)$ or $p = (c, x_p, y_p, w_p, h_p)$ and a corresponding detected object part $d = (x_d, y_d, w_d, h_d)$ or $d = (c, x_d, y_d, w_d, h_d)$, the four corners of the part location representations or bounding boxes are regarded as corresponding points:

$(x_p, y_p) \leftrightarrow (x_d, y_d)$ $(x_p + w_p, y_p) \leftrightarrow (x_d + w_d, y_d)$ $(x_p, y_p + h_p) \leftrightarrow (x_d, y_d + h_d)$ $(x_p + w_p, y_p + h_p) \leftrightarrow (x_d + w_d, y_d + h_d)$ where $\leftrightarrow$ denotes correspondence. In an alternative embodiment, the four corners are instead defined as:

$(x1_p, y1_p) \leftrightarrow (x1_d, y1_d)$ $(x2_p, y1_p) \leftrightarrow (x2_d, y1_d)$ $(x1_p, y2_p) \leftrightarrow (x1_d, y2_d)$ $(x2_p, y2_p) \leftrightarrow (x2_d, y2_d)$ In an embodiment, the object parts from the geometric model are matched with the detected object parts based on their class c. If an object part from the geometric model was not detected in step S1 of FIG. 6, that object part is ignored in the estimation of the homography. If more than one object part (detected or from the geometric model) has the same class, all possible 1-1 mappings are tried for the these object parts. As an example, consider an object with object parts $p_1$, $p_2$, $p_3$ with corresponding classes $c_1$, $c_1$, $c_2$. The detected object parts that we want to match are $d_1$, $d_2$, $d_3$ with classes $c_1$, $c_1$, $c_2$. Then the possible sets of matches $\{(p_1, d_1), (p_2, d_2), (p_3, d_3)\}$ and $\{(p_1, d_2), (p_2, d_1), (p_3, d_3)\}$ are considered. The homography is estimated and the error is calculated for each set of matches and the one resulting in the smallest error is kept and used in step S7 in FIG. 6.

In an embodiment, the method also comprises an initial verification whether the picture taken by the user device can be used in the object locating method. For instance, when a new picture is captured by the camera of the user device, one or more sensors in the user device can be used to verify that the user device was held horizontally with regard to the ground when the picture was captured. This initial verification ensures that objects appear in specific, known orientations. Hence, if the user device was slanted or rotated when the picture was taken as verified using the at least one sensor, then the picture is preferably ignored.

Alternatively, different geometric models may be available for different angles or rotations of the object and the object parts. In such a case, the particular geometric model to use for a current picture could be determined based on the orientation or rotation angle of the user device when capturing the picture as determined by the at least one sensor. For instance, a first geometric model is used if the rotation angle of the user device relative ground is ±10°, a second geometric model is used if the rotation angle is 10-45°, and so forth.

Figure 20:
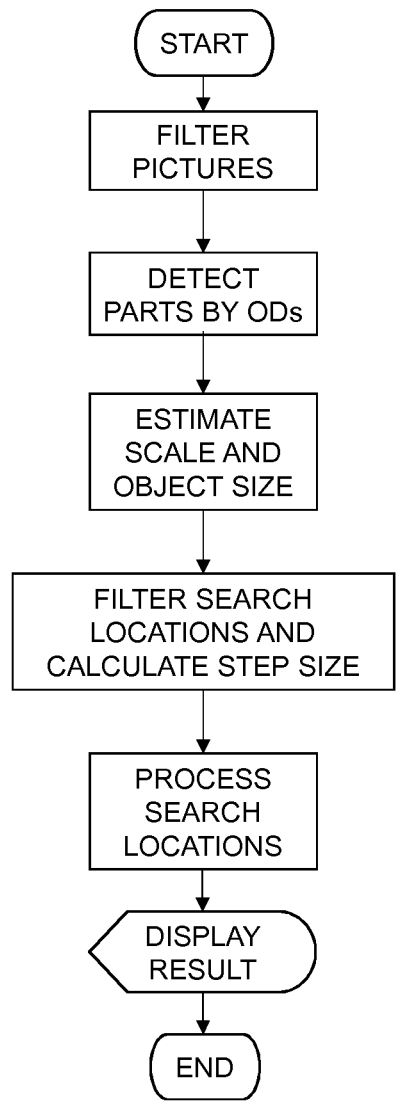
FIG. 20 is a flow chart illustrating an example of an object locating method.

FIG. 20 is a flow chart illustrating an embodiment of the object locating method. In a first step, pictures are filtered based on orientation. When a new picture is captured by the camera, at least one sensor of the user device is used to ensure that the user device was being held horizontally with regard to the ground. This ensures that the objects appear in specific, known orientations. If the user device was slanted, the picture is ignored. A next step comprises detecting object parts. In this step, the bounding boxes and classes for the object parts in the picture are determined using object detectors trained to detect object parts. A list of bounding boxes $L_{display}$ to be displayed to the user and a list $L_{parts}$ of object parts that can be used to find objects are created. The detected object parts are added to both lists. The size of the object is then estimated. Since all objects are in the same plane, a scaling factor s can be estimated and used to multiply the width and height (w, h) of the object from the geometric model to obtain its approximate size in picture coordinates.

$$(w_{pic}, h_{pic}) = (s \times w, s \times h)$$

In order to estimate the scaling factor, a scaling factor $s_i$ is calculated for each detected object part, which has a corresponding object part of the same class in the geometric model. The median scaling factor of the calculated scaling factors is then used as the estimate:

$$s = \underset{1 \le i \le N}{\text{median}}\, s_i = \underset{1 \le i \le N}{\text{median}} \sqrt{\frac{w_{d_i} * h_{d_i}}{w_{p_i} * h_{p_i}}}$$

N is the number of detected object parts with classes that appear in the geometric model, $(w_{d_i}, h_{d_i})$ is the width and height of the bounding box of each detected object part $d_i$ and $(w_{p_i}, h_{p_i})$ is the width and height of the bounding box of the corresponding object part $p_i$ from the geometric model. It is possible to estimate s in other ways. A separate embodiment could use the mean instead of the median, i.e., $$s = \frac{1}{N} \sum_{i=1}^{N} s_i.$$

Thereafter the search locations that should be considered are selected. The estimated size of the object is used as the size of the search window that is used to check if the object is present. To avoid having to use each pixel as a possible search location where we slide the search window, $(x_{d_i}, y_{d_i})$ i.e., the top-left corner from the detected object parts $d_i$, is used to generate possible search locations. The top-left corners for each search window are taken from $\{(x_{d_i}, y_{d_j}): 1 \le i, j \le N\}$, i.e., all x coordinates and y coordinates from the top left corners of each detected object part form a grid of possible search locations, as shown in FIG. 17. Each search location is checked in a left-to-right, top-to-bottom fashion.

To further reduce the number of search locations even further, minimal step sizes are calculated both in the horizontal and vertical directions based on the size of the object parts:

$$x_{step} = \frac{1}{2} \underset{1 \le i \le N}{\min}\, w_{d_i}$$

$$y_{step} = \frac{1}{2} \underset{1 \le i \le N}{\min}\, h_{d_i}$$

When moving horizontally in the grid, consecutive search locations are ignored when the change or horizontal step is smaller than the minimal step size, i.e. $\Delta x < x_{step}$. Similarly, when moving vertically consecutive locations are ignored for which $\Delta y < y_{step}$.

Figure 21:
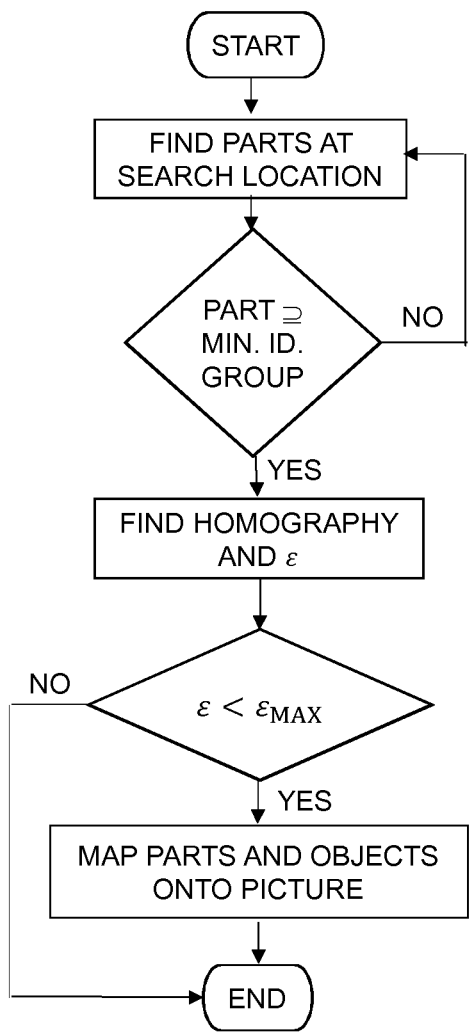
FIG. 21 is a flow chart illustrating an example of processing search locations according to the method shown in FIG. 20.

FIG. 21 illustrates the processing taking place for each of the search locations. A first step comprises finding the object parts from $L_{parts}$ that are inside the search window at the current search location. A next step verifies that the object parts in the search window can form at least one minimal identifying group from the geometric model of the object, and that there are no extra object parts in the search window. If not, the object is not at this search location and the next search location can be considered. If the identified detected object parts form at least one minimal identifying group and if there are no extra object parts in the search window not forming part of the object, the homography H mapping the object parts in the geometric model to the detected object parts is estimated together with the associated error ε. Then, if $\varepsilon < \varepsilon_{max}$, the homography H is used to map the bounding boxes for the object and for any missing object parts into the picture coordinates.

If any of the new bounding boxes overlaps with a detected object part of the same class, their IoU is calculated. Then, if the IoU>0.4, the new bounding box is discarded and the detected object part is removed from $L_{parts}$. This is done to avoid creating multiple bounding boxes for the same class, which can happen when the search window does not align properly with the object. The object parts corresponding to the non-discarded new bounding boxes are added to $L_{display}$, and the detected object parts identified in the search window at the current search location are removed from $L_{parts}$.

Then the results are displayed as shown in FIG. 20. This means that all the bounding boxes in $L_{display}$ are drawn on top of the original picture and displayed to the user. In order to find more than one class of object, the filtering step, detecting step and displaying step in FIG. 20 are done once for each picture, while the other steps in FIG. 20 are preferably repeated for each object.

Another aspect of the embodiments relates to an object locator comprising a processing circuitry and a memory comprising instructions executable by the processing circuitry. The processing circuitry is operative to apply at least one object detector to a picture to detect object parts in the picture and generate, for each detected object part, a part location representation defining a region of the picture. The processing circuitry is also operative to estimate a size of an object comprising object parts in the picture based on a geometric model of the object and of the object parts and based on the part location representations. The processing circuitry is further operative to determine, based on the part location representations, search locations in the picture for a search window having a size that is based on the estimated size of the object. The processing circuitry is operative to identify, for at least a portion of the determined search locations, any detected object part within the search window positioned at the determined search location. The processing circuitry is also operative to estimate, for at least a portion of the determined search location, a homography mapping object part(s) in the geometric model to the identified detected object part(s) by minimizing an error between the mapped object part(s) and the identified detected object part(s). The processing circuitry is further operative to determine, for at least a portion of the determined search locations and if the error is smaller than a threshold value and for the object, an object location representation defining a region of the picture based on the homography and the geometric model.

In an embodiment, the processing circuitry is operative to calculate a scaling factor based on the part location representations and determine the size of the object based on the scaling factor and a default size of the object defined by the geometric model.

In an embodiment, the processing circuitry is operative to calculate the scaling factor $$s = f\left(\sqrt{\frac{w_{d_i} \times h_{d_i}}{w_{p_i} \times h_{p_i}}}\right).$$

In this embodiment, $(w_{d_i}, h_{d_i})$ represents width and height of the region of the picture defined by a part location representation for a detected object part $d_i$, $(w_{p_i}, h_{p_i})$ represents width and height of a region defined by a part location representation for an object part $p_i$ from the geometric model, $f( )$ is a function, i=1 . . . N and N represents the number of detected object parts.

In an embodiment, the processing circuitry is operative to determine a grid $\{x_{d_i}, y_{d_j}\}$ of search locations in the picture. In this embodiment, $(x_{d_i}, y_{d_j})$ represents a coordinate of the region of the picture defined by a part location representation for a detected object part $d_i$, 1≤i,j≤N and N represents the number of detected object parts.

In an embodiment, the processing circuitry is operative to determine a minimum step size $x_{step}$ in the x direction and a minimum step size $y_{step}$ in the y direction based on the part location representations. In this embodiment, the processing circuitry is also operative to identify any detected object part and estimate the homography for search locations of the grid having a distance, in the x direction, to a neighboring search location in the grid equal to or exceeding $x_{step}$ and having a distance, in the y direction, to a neighboring search location in the grid equal to or exceeding $y_{step}$.

In an embodiment, the processing circuitry is operative to calculate $$x_{step} = \frac{1}{Z} \min_{1 \leq i \leq N} w_{d_i}$$

and calculate $$y_{step} = \frac{1}{Z} \min_{1 \leq j \leq N} w_{d_j}.$$

In this embodiment, Z is a positive number larger than one and $(w_{d_i}, h_{d_i})$ represents width and height of the region of the picture defined by a part location representation for a detected object part $d_i$.

In an embodiment, the processing circuitry is operative to estimate the homography if the identified detected object part(s) form(s) at least a minimal identifying group defined by the geometrical model and constituting a distinctive group of object parts uniquely defining the object.

In an embodiment, the processing circuitry is operative to estimate the homography if the search window does not comprise any identified detected object part not belonging to the object.

In an embodiment, the processing circuitry is operative to, for the at least a portion of the determined search locations and if the error is smaller than the threshold value, determine an additional part location representation defining a region of the picture for any object part of the object not present among the part location representations of the detected object parts based on the homography and the geometric model.

In an embodiment, the processing circuitry is operative to create a list $L_{part}$ of the detected object parts and create a list $L_{display}$ of location representations to be displayed. In this embodiment, $L_{display}$ comprises part location representations of the detected object parts. The processing circuitry is also operative in this embodiment to identify any detected object part from $L_{part}$ within the search window positioned at the search location.

In an embodiment, the processing circuitry is operative to, for the at least a portion of the determined search locations and if the error is smaller than the threshold value, discard an additional part location representation overlapping with a part location representation of a detected object part outside of the search window positioned at the determined search location. The processing circuitry is also operative to remove, from $L_{part}$, the detected object part having a part location representation overlapping with the discarded additional part location representation. The processing circuitry is further operative to add non-discarded additional part location representations to $L_{display}$ and remove, from $L_{part}$, the identified detected object part(s).

In an embodiment, the processing circuitry is operative to, for the at least a portion of the determined search locations and if the error is smaller than the threshold value, calculate an IoU for an additional part location representation and a part location representation of a detected object part outside of the search window positioned at the determined search location. The processing circuitry is also operative to determine the additional part location representation to be overlapping with the part location representation of the detected object part if the IoU exceeds a threshold value.

In an embodiment, the processing circuitry is operative to draw location representations in $L_{display}$ onto the picture.

In an embodiment, the processing circuitry is operative to map, if the error is smaller than the threshold value and for the object, an object location representation from the geometric model into the object location representation defining a region of the picture based on the homography.

In an embodiment, the processing circuitry is operative to add the object location representation to $L_{display}$.

In an embodiment, the processing circuitry is operative to estimate the homography $$H = \begin{bmatrix} h_{11} & h_{12} & h_{13} \\ h_{21} & h_{22} & h_{23} \\ h_{31} & h_{31} & h_{31} \end{bmatrix}$$

by minimizing the squared error $$\varepsilon = \sum_{i=1}^{M} \left(x'_i - \frac{h_{11}x_i + h_{12}y_i + h_{13}}{h_{31}x_i + h_{32}y_i + h_{33}}\right)^2 + \left(y'_i - \frac{h_{21}x_i + h_{22}y_i + h_{23}}{h_{31}x_i + h_{32}y_i + h_{33}}\right)^2$$

In this embodiment, $(x_i, y_i)$, 1≤i≤M represents a coordinate of a part location representation from the geometric model, $(x'_i, y'_i)$, 1≤i≤M represents a corresponding coordinate of a part location representation of an identified detected object part and M represents the number of coordinates.

A related aspect of the embodiments defines an object locator. The object locator is configured to apply at least one object detector to a picture to detect object parts in the picture and generate, for each detected object part, a part location representation defining a region of the picture. The object locator is also configured to estimate a size of an object comprising object parts in the picture based on a geometric model of the object and of the object parts and based on the part location representations. The object locator is further configured to determine, based on the part location representations, search locations in the picture for a search window having a size that is based on the estimated size of the object. The object locator is configured to identify, for at least a portion of the determined search locations, any detected object part within the search window positioned at the determined search location. The object locator is also configured to estimate, for at least a portion of the determined search location, a homography mapping object part(s) in the geometric model to the identified detected object part(s) by minimizing an error between the mapped object part(s) and the identified detected object part(s). The object locator is further configured to determine, for at least a portion of the determined search locations and if the error is smaller than a threshold value and for the object, an object location representation defining a region of the picture based on the homography and the geometric model.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 22:
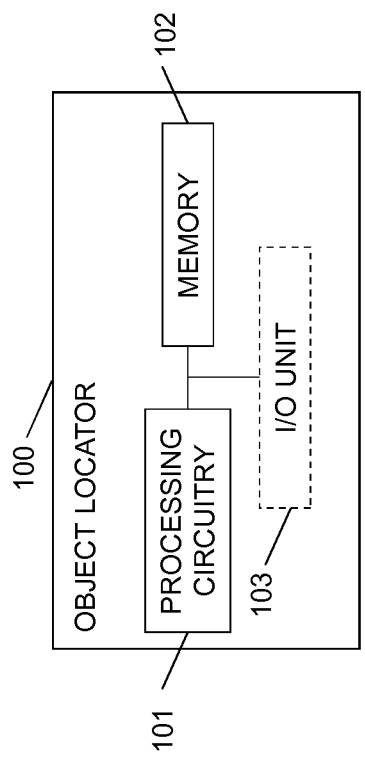
FIG. 22 is a block diagram of an object locator according to an embodiment.

FIG. 22 is a schematic block diagram illustrating an example of an object locator 100 according to an embodiment. In this particular example, the object locator 100 comprises a processing circuitry 101, such as a processor, and a memory 102. The memory 102 comprises instructions executable by the processing circuitry 101.

Optionally, the object locator 100 may also include a communication circuit, represented by a respective input/output (I/O) unit 103 in FIG. 22. The I/O unit 103 may include functions for wired and/or wireless communication with other devices, servers and/or network nodes in a wired or wireless communication network. In a particular example, the I/O unit 103 may be based on radio circuitry for communication with one or more other nodes, including transmitting and/or receiving information. The I/O unit 103 may be interconnected to the processing circuitry 101 and/or memory 102. By way of example, the I/O unit 103 may include any of the following: a receiver, a transmitter, a transceiver, I/O circuitry, input port(s) and/or output port(s).

Figure 23:
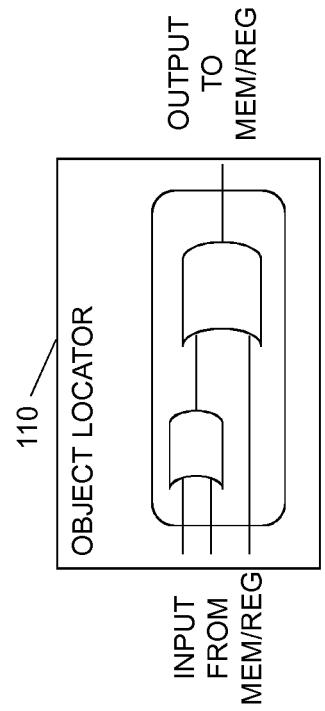
FIG. 23 is a block diagram of an object locator according to another embodiment.

FIG. 23 is a schematic block diagram illustrating an object locator 110 based on a hardware circuitry implementation according to an embodiment. Particular examples of suitable hardware circuitry include one or more suitably configured or possibly reconfigurable electronic circuitry, e.g., Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 24:
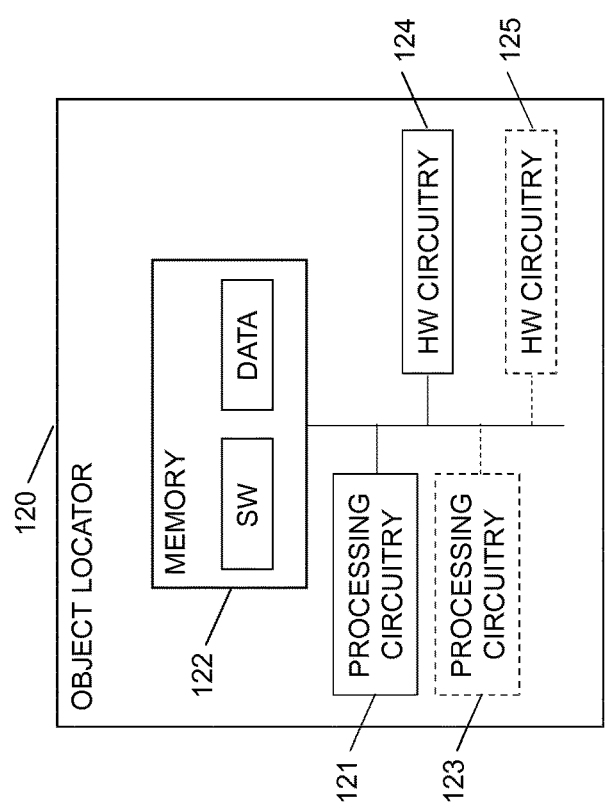
FIG. 24 is a block diagram of an object locator according to a further embodiment.

FIG. 24 is a schematic block diagram illustrating yet another example of an object locator based on combination of both processing circuitry/circuitries 121, 123 and hardware circuitry 124, 125 in connection with suitable memory unit(s) 122. The overall functionality is, thus, partitioned between programmed software for execution on one or more processing circuitries 121, 123 and one or more pre-configured or possibly reconfigurable hardware circuits 124, 125. The actual hardware-software partitioning can be decided by a system designer based on a number of factors including processing speed, cost of implementation and other requirements.

Figure 25:
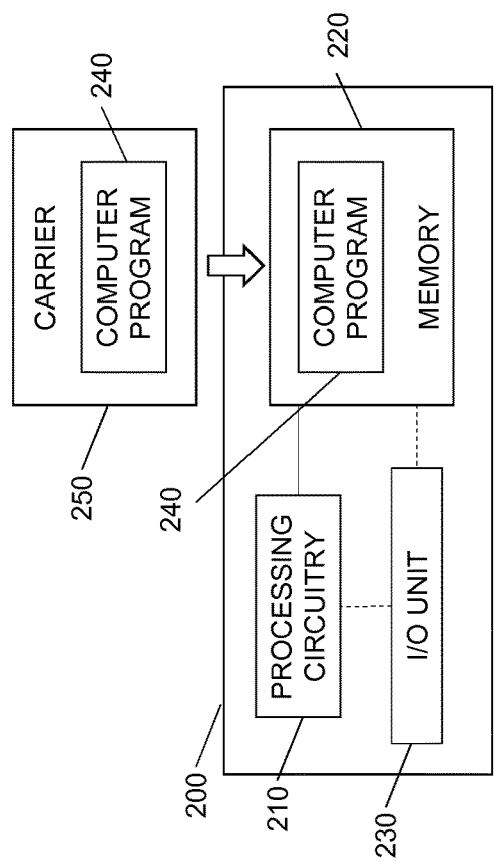
FIG. 25 schematically illustrates a computer program based implementation of an embodiment.

FIG. 25 is a computer program based implementation of an object locator 200 according to an embodiment. In this particular example, at least some of the steps, functions, procedures, modules and/or blocks described herein are implemented in a computer program 240, which is loaded into the memory 220 for execution by processing circuitry including one or more processing circuitries 210. The processing circuitry/circuitries 210 and memory 220 are interconnected to each other to enable normal software execution. An optional I/O unit 230 may also be interconnected to the processing circuitry/circuitries 210 and/or the memory 220 to enable input and/or output of relevant data, such as pictures and detection information.

The term 'processing circuitry' should be interpreted in a general sense as any circuitry, system or device capable of executing program code or computer program instructions to perform a particular processing, determining or computing task.

The processing circuitry 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by at least one processing circuitry 210, cause the at least one processing circuitry 210 to apply at least one object detector to a picture to detect object parts in the picture and generate, for each detected object part, a part location representation defining a region of the picture. The at least one processing circuitry 210 is also caused to estimate a size of an object comprising object parts in the picture based on a geometric model of the object and of the object parts and based on the part location representations. The at least one processing circuitry 210 is further caused to determine, based on the part location representations, search locations in the picture for a search window having a size that is based on the estimated size of the object. The at least one processing circuitry 210 is caused to identify, for at least a portion of the determined search locations, any detected object part within the search window positioned at the determined search location. The at least one processing circuitry 210 is also caused to estimate, for at least a portion of the determined search location, a homography mapping object part(s) in the geometric model to the identified detected object part(s) by minimizing an error between the mapped object part(s) and the identified detected object part(s). The at least one processing circuitry 210 is further caused to determine, for at least a portion of the determined search locations and if the error is smaller than a threshold value and for the object, an object location representation defining a region of the picture based on the homography and the geometric model.

The proposed technology also provides a carrier 250, also referred to as computer program product, comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 stored on a computer-readable storage medium, such as the memory 220, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may, thus, be loaded into the operating memory 220 for execution by the processing circuitry 210.

The computer program product 250 has stored thereon a computer program 240 comprising instructions which, when executed on a processing circuitry 210, cause the processing circuitry 210 to apply at least one object detector to a picture to detect object parts in the picture and generate, for each detected object part, a part location representation defining a region of the picture. The processing circuitry 210 is also caused to estimate a size of an object comprising object parts in the picture based on a geometric model of the object and of the object parts and based on the part location representations. The processing circuitry 210 is further caused to determine, based on the part location representations, search locations in the picture for a search window having a size that is based on the estimated size of the object. The processing circuitry 210 is caused to identify, for at least a portion of the determined search locations, any detected object part within the search window positioned at the determined search location. The processing circuitry 210 is also caused to estimate, for at least a portion of the determined search location, a homography mapping object part(s) in the geometric model to the identified detected object part(s) by minimizing an error between the mapped object part(s) and the identified detected object part(s). The processing circuitry 210 is further caused to determine, for at least a portion of the determined search locations and if the error is smaller than a threshold value and for the object, an object location representation defining a region of the picture based on the homography and the geometric model.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 26:
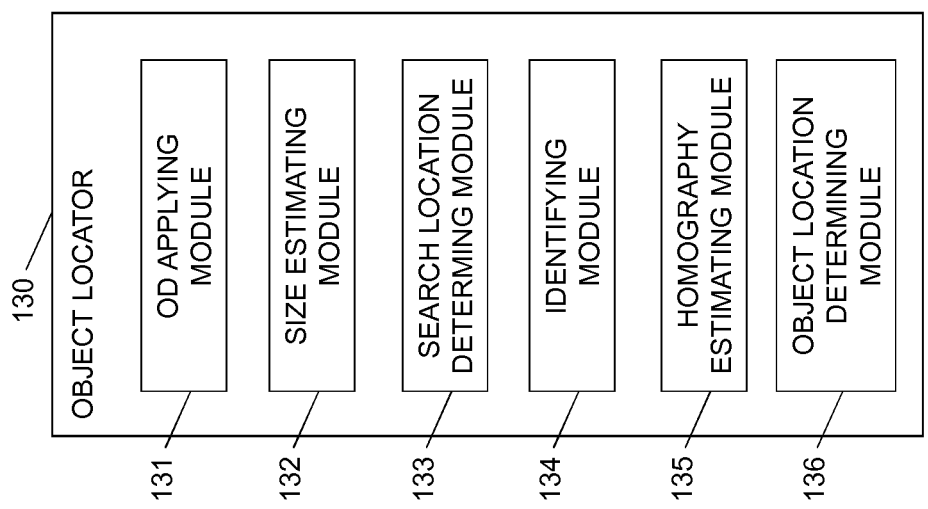
FIG. 26 is a block diagram of an object locator according to another embodiment.

FIG. 26 is a block diagram of an object locator 130. The object locator 130 comprises object detection (OD) applying module locator 131 for applying at least one object detector to a picture to detect object parts in the picture and generate, for each detected object part, a part location representation defining a region of the picture. The object locator 130 also comprises a size estimating module 132 for estimating a size of an object comprising object parts in the picture based on a geometric model of the object and of the object parts and based on the part location representations. The object locator 130 further comprises a search location determining module 133 for determining, based on the part location representations, search locations in the picture for a search window having a size that is based on the estimated size of the object. The object locator 130 comprises an identifying module 134 for identifying, for at least a portion of the determined search locations, any detected object part within the search window positioned at the determined search location. The object locator 130 also comprises a homography estimating module 135 for estimating, for at least a portion of the determined search location, a homography mapping object part(s) in the geometric model to the identified detected object part(s) by minimizing an error between the mapped object part(s) and the identified detected object part(s). The object locator 130 further comprises an object location determining module 136 for determining, for at least a portion of the determined search locations and if the error is smaller than a threshold value and for the object, an object location representation defining a region of the picture based on the homography and the geometric model.

A further aspect relates to a user device 1, see FIGS. 1 and 2, comprising an object locator 100 according to the invention, such as described in connection with any of FIGS. 22 to 26. In an embodiment, the user device 1 also comprises, or is connected to, a camera 2 configured to capture pictures and/or record video. In an embodiment, the user device 1 also comprises, or is connected to, at least one sensor configured to determine a rotation angle of the user device 1 relative ground. The at least one sensor could, for instance, be used to determine whether the user device 1 was held horizontally with regard to ground when the camera 2 took a picture or recorded a video.

Illustrative, but non-limiting, examples of such sensors in the user device include an accelerometer, a magnetometer, and a gyroscope.

In an embodiment, the user device 1 is selected from a group consisting of a computer, a laptop, a smart phone, a mobile phone, a tablet, a multimedia player, a set-top box, and a game console.

It is also becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources, such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software can be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and NIC(s), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a set of applications. In an example embodiment, each of the software containers, also called virtualization engines, virtual private servers, or jails, is a user space instance, typically a virtual memory space. These user space instances may be separate from each other and separate from the kernel space in which the operating system is executed. Then, the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

According to yet another embodiment, there is provided a hybrid network device, which includes both custom processing circuitry/proprietary OS and COTS processors/standard OS in a network device, e.g. in a card or circuit board within a network device. In certain embodiments of such a hybrid network device, a platform Virtual Machine (VM), such as a VM that implements functionality of a special-purpose network device, could provide for para-virtualization to the hardware present in the hybrid network device.

Figure 27:
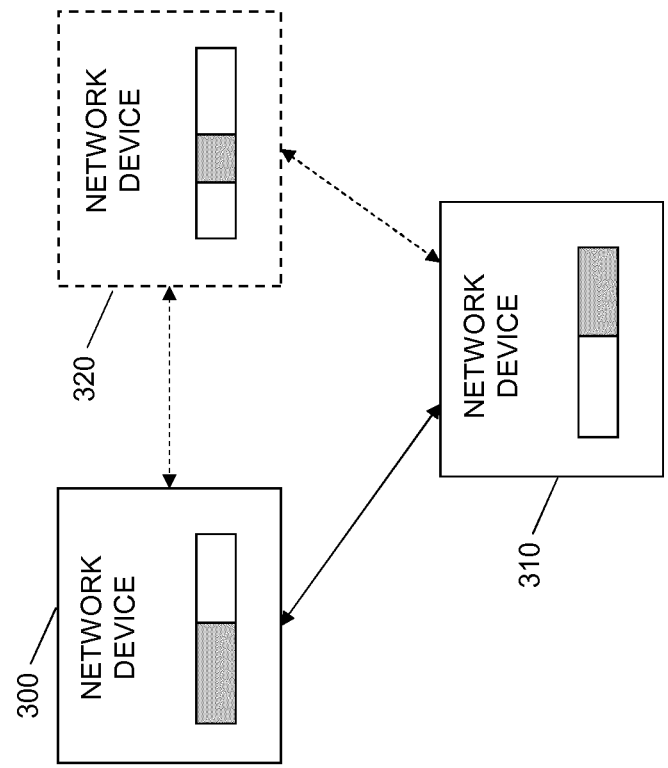
FIG. 27 schematically illustrates a distributed implementation among network devices.

FIG. 27 is a schematic diagram illustrating an example of how functionality can be distributed or partitioned between different network devices in a general case. In this example, there are at least two individual, but interconnected network devices 300, 310, which may have different functionalities, or parts of the same functionality, partitioned between the network devices 300, 310. There may be additional network device 320 being part of such a distributed implementation. The network devices 300, 310, 320 may be part of the same wireless or wired communication system, or one or more of the network devices may be so-called cloud-based network devices located outside of the wireless or wired communication system.

As used herein, the term "network device" may refer to any device located in connection with a communication network, including but not limited to devices in access networks, core networks and similar network structures. The term network device may also encompass cloud-based network devices.

Figure 28:
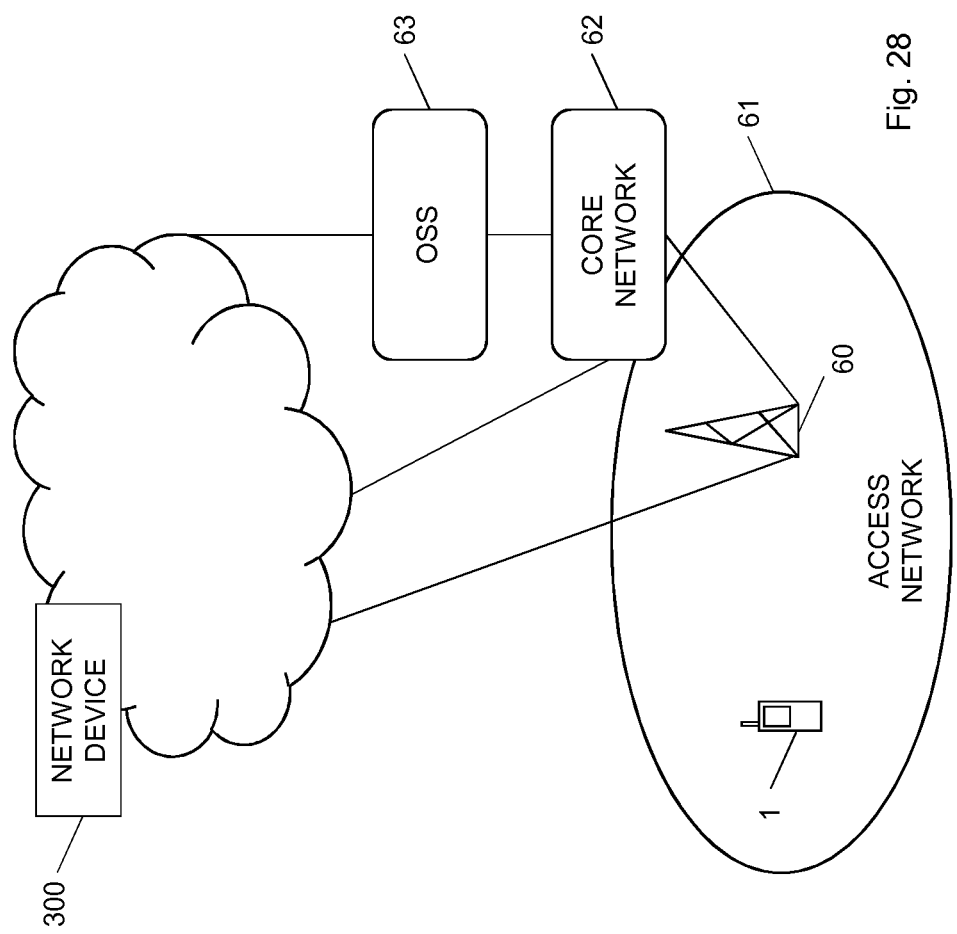
FIG. 28 is a schematic illustration of an example of a wireless communication system with one or more cloud-based network devices according to an embodiment.

FIG. 28 is a schematic diagram illustrating an example of a wireless communication system, including a radio access network (RAN) 61 and a core network 62 and optionally an operations and support system (OSS) 63 in cooperation with one or more cloud-based network devices 300. The figure also illustrates a user device 1, connected to the RAN 61 and capable of conducting wireless communication with a RAN node 60, such as a network node, a base station, node B (NB), evolved node B (eNB), next generation node B (gNB), etc.

The network device 300 illustrated as a cloud-based network device 300 in FIG. 28 may alternatively be implemented in connection with, such as at, the RAN node 60.

The network node 60, 300 may, in an embodiment, comprise an object locator according to the embodiments.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An object locator, comprising:
processing circuitry; and
memory containing instructions executable by the processing circuitry whereby the processing circuitry is operative to:
apply at least one part-based object detector to a picture to detect object parts in the picture and generate, for each detected object part, a part location representation defining a region of the picture;
estimate a size of an object comprising the object parts in the picture based on a geometric model of the object and of the object parts and based on the part location representations, wherein the geometric model defines a geometry of the object and its included object parts;
determine, based on the part location representations, search locations in the picture for a search window having a size that is based on the estimated size of the object; and
for at least a portion of the determined search locations:
identify any detected object part within the search window positioned at the determined search location;
estimate a homography mapping object part(s) in the geometric model to the identified detected object part(s) by minimizing an error between the mapped object part(s) and the identified detected object part(s); and
determine, when the error is smaller than a threshold value and for the object, an object location representation defining a region of the picture based on the homography and the geometric model.

2. The object locator of claim 1, wherein the instructions are such that the processing circuitry is operative to:
calculate a scaling factor based on the part location representations; and
determine the size of the object based on the scaling factor and a default size of the object defined by the geometric model.

3. The object locator of claim 2, wherein the instructions are such that the processing circuitry is operative to calculate the scaling factor $$s = f\left(\sqrt{\frac{w_{d_i} * h_{d_i}}{w_{p_i} * h_{p_i}}}\right),$$

wherein $$s = f\left(\sqrt{\frac{w_{d_i} * h_{d_i}}{w_{p_i} * h_{p_i}}}\right)$$

represents width and height of the region of the picture defined by a part location representation for a detected object part $d_i$, $(w_{p_i}, h_{p_i})$ represents width and height of a region defined by a part location representation for an object part $p_i$ from the geometric model, $f(\square)$ is a function, i=1 ... N, and N represents the number of detected object parts.

4. The object locator of claim 1, wherein the processing circuitry is operative to determine a grid $\{x_{d_i}, y_{d_j}\}$ of search locations in the picture, wherein $(x_{d_i}, y_{d_j})$ represents a coordinate of the region of the picture defined by a part location representation for a detected object part $d_i$, $1 \le i,j \le N$, and N represents the number of detected object parts.

5. The object locator of claim 4, wherein the instructions are such that the processing circuitry is operative to:
determine a minimum step size $x_{step}$ in the x direction and a minimum step size y step in the y direction based on the part location representations; and
identify any detected object part and estimate the homography for search locations of the grid having a distance, in the x direction, to a neighboring search location in the grid equal to or exceeding $x_{step}$ and having a distance, in the y direction, to a neighboring search location in the grid equal to or exceeding $y_{step}$.

6. The object locator of claim 5, wherein the processing circuitry is operative to:
calculate $$x_{step} = \frac{1}{Z} \min_{1 \le i \le N} w_{d_i};$$

and
calculate $$y_{step} = \frac{1}{Z} \min_{1 \le j \le N} w_{d_j},$$

wherein Z is a positive number larger than one and $(w_{d_i}, h_{d_i})$ represents width and height of the region of the picture defined by a part location representation for a detected object part $d_i$.

7. The object locator of claim 1, wherein the instructions are such that the processing circuitry is operative to estimate the homography if the identified detected object part(s) form(s) at least a minimal identifying group defined by the geometrical model and constituting a distinctive group of object parts uniquely defining the object.

8. The object locator of claim 1, wherein the instructions are such that the processing circuitry is operative to estimate the homography if the search window does not comprise any identified detected object part not belonging to the object.

9. The object locator of claim 1, wherein the instructions are such that the processing circuitry is operative to, for the at least a portion of the determined search locations and if the error is smaller than the threshold value, determine an additional part location representation defining a region of the picture for any object part of the object not present among the part location representations of the detected object parts based on the homography and the geometric model.

10. The object locator of claim 1, wherein the instructions are such that the processing circuitry is operative to:
create a list $L_{part}$ of the detected object parts;
create a list $L_{display}$ of location representations to be displayed, wherein $L_{display}$ comprises part location representations of the detected object parts; and
identify any detected object part from $L_{part}$ within the search window positioned at the determined search location.

11. The object locator of claim 9, wherein the instructions are such that the processing circuitry is operative to:
create a list $L_{part}$ of the detected object parts;
create a list $L_{display}$ of location representations to be displayed, wherein $L_{display}$ comprises part location representations of the detected object parts;
identify any detected object part from $L_{part}$ within the search window positioned at the determined search location; and
for the at least a portion of the determined search locations and if the error is smaller than the threshold value:
discard an additional part location representation overlapping with a part location representation of a detected object part outside of the search window positioned at the determined search location;
remove, from $L_{part}$, the detected object part having a part location representation overlapping with the discarded additional part location representation;
add non-discarded additional part location representations to $L_{display}$; and
remove, from $L_{part}$, the identified detected object part(s).

12. The object locator of claim 11, wherein the instructions are such that the processing circuitry is operative to, for the at least a portion of the determined search locations and if the error is smaller than the threshold value:
calculate an intersection over union (IoU) for an additional part location representation and a part location representation of a detected object part outside of the search window positioned at the determined search location; and
determine the additional part location representation to be overlapping with the part location representation of the detected object part if the IoU exceeds a threshold value.

13. The object locator of claim 11, wherein the instructions are such that the processing circuitry is operative to draw location representations in $L_{display}$ onto the picture.

14. The object locator of claim 1, wherein the instructions are such that the processing circuitry is operative to map, if the error is smaller than the threshold value and for the object, an object location representation from the geometric model into the object location representation defining a region of the picture based on the homography.

15. The object locator of claim 10, wherein the instructions are such that the processing circuitry is operative to:
map, if the error is smaller than the threshold value and for the object, an object location representation from the geometric model into the object location representation defining a region of the picture based on the homography; and
add the object location representation defining a region of the picture to $L_{display}$.

16. The object locator of claim 1, wherein the instructions are such that the processing circuitry is operative to estimate the homography $$H = \begin{bmatrix} h_{11} & h_{12} & h_{13} \\ h_{21} & h_{22} & h_{23} \\ h_{31} & h_{31} & h_{31} \end{bmatrix}$$

by minimizing the squared error $$\varepsilon = \sum_{i=1}^{M} \left(x_i' - \frac{h_{11}x_i + h_{12}y_i + h_{13}}{h_{31}x_i + h_{32}y_i + h_{33}}\right)^2 + \left(y_i' - \frac{h_{21}x_i + h_{22}y_i + h_{23}}{h_{31}x_i + h_{32}y_i + h_{33}}\right)^2;$$

wherein $(x_i, y_i)$, $1 \leq i \leq M$ represents a coordinate of a part location representation from the geometric model, $(x_i', y_i')$, $1 \leq i \leq M$ represents a corresponding coordinate of a part location representation of an identified detected object part and M represents the number of coordinates.

17. A user device, comprising
an object locator, the object locator comprising processing circuitry and memory containing instructions executable by the processing circuitry whereby the processing circuitry is operative to:
apply at least one part-based object detector to a picture to detect object parts in the picture and generate, for each detected object part, a part location representation defining a region of the picture;
estimate a size of an object comprising the object parts in the picture based on a geometric model of the object and of the object parts and based on the part location representations, wherein the geometric model defines a geometry of the object and its included object parts;
determine, based on the part location representations, search locations in the picture for a search window having a size that is based on the estimated size of the object; and
for at least a portion of the determined search locations:
identify any detected object part within the search window positioned at the determined search location;
estimate a homography mapping object part(s) in the geometric model to the identified detected object part(s) by minimizing an error between the mapped object part(s) and the identified detected object part(s); and
determine, when the error is smaller than a threshold value and for the object, an object location representation defining a region of the picture based on the homography and the geometric model.

18. The user device of claim 17, further comprising a camera configured to capture the picture.

19. A network node, comprising:
an object locator, the object locator comprising processing circuitry and memory containing instructions executable by the processing circuitry whereby the processing circuitry is operative to:
apply at least one part-based object detector to a picture to detect object parts in the picture and generate, for each detected object part, a part location representation defining a region of the picture;

estimate a size of an object comprising the object parts in the picture based on a geometric model of the object and of the object parts and based on the part location representations, wherein the geometric model defines a geometry of the object and its included object parts;

determine, based on the part location representations, search locations in the picture for a search window having a size that is based on the estimated size of the object; and for at least a portion of the determined search locations:
identify any detected object part within the search window positioned at the determined search location;

estimate a homography mapping object part(s) in the geometric model to the identified detected object part(s) by minimizing an error between the mapped object part(s) and the identified detected object part(s); and determine, when the error is smaller than a threshold value and for the object, an object location representation defining a region of the picture based on the homography and the geometric model.

20. A method of object locating, the method comprising:
applying at least one part-based object detector to a picture to detect object parts in the picture and generate, for each detected object part, a part location representation defining a region of the picture;

estimating a size of an object comprising the object parts in the picture based on a geometric model of the object and of the object parts and based on the part location representations, wherein the geometric model defines a geometry of the object and its included object parts;

determining, based on the part location representations, search locations in the picture for a search window having a size that is based on the estimated size of the object; and for at least a portion of the determined search locations:
identifying any detected object part within the search window positioned at the determined search location;

estimating a homography mapping object part(s) in the geometric model to the identified detected object part(s) by minimizing an error between the mapped object part(s) and the identified detected object part(s); and determining, when the error is smaller than a threshold value and for the object, an object location representation defining a region of the picture based on the homography and the geometric model.

* * * * *